US010389858B2

(12) United States Patent
Yu et al.

(10) Patent No.: US 10,389,858 B2
(45) Date of Patent: Aug. 20, 2019

(54) CAMERA MODULE HAVING LENS BARREL

(71) Applicant: SAMSUNG ELECTRONICS CO., LTD., Suwon-si, Gyeonggi-do (KR)

(72) Inventors: Young Bok Yu, Suwon-si (KR); Hyungjin Rho, Yongin-si (KR); Kihuk Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/896,316

(22) Filed: Feb. 14, 2018

(65) Prior Publication Data

US 2018/0234529 A1 Aug. 16, 2018

(30) Foreign Application Priority Data

Feb. 15, 2017 (KR) ........................ 10-2017-0020331

(51) Int. Cl.
*H04M 1/02* (2006.01)
*H04N 5/225* (2006.01)
(Continued)

(52) U.S. Cl.
CPC ............ *H04M 1/0264* (2013.01); *G02B 7/08* (2013.01); *G02B 13/001* (2013.01); *G02B 13/009* (2013.01); *G02B 27/646* (2013.01); *G03B 3/10* (2013.01); *H02K 41/0356* (2013.01); *H04N 5/2254* (2013.01); *H04N 5/2258* (2013.01);
(Continued)

(58) Field of Classification Search
CPC ............... H04N 5/2257; H04N 5/2252; H04N 5/23212; H04N 5/23293; G02B 7/09
See application file for complete search history.

(56) References Cited

U.S. PATENT DOCUMENTS

2016/0316150 A1* 10/2016 Eromaki ................ H04N 5/247
2017/0094180 A1* 3/2017 Miller ................ H04N 5/23296
(Continued)

FOREIGN PATENT DOCUMENTS

WO 2016/156996 10/2016
WO 2017/058409 4/2017

OTHER PUBLICATIONS

Extended Search Report dated Jul. 10, 2018 in counterpart European Patent Application No. EP18156980.7.

*Primary Examiner* — Abdelaaziz Tissire
(74) *Attorney, Agent, or Firm* — Nixon & Vanderhye P.C.

(57) ABSTRACT

Disclosed a dual camera module. The dual camera module may include a housing; at least one image sensor disposed in the housing; a first lens barrel including at least one first lens and disposed in a first portion of the housing facing a first portion of the at least one image sensor; a second lens barrel including at least one second lens and disposed in a second portion of the housing facing a second portion of the at least one image sensor; a first coil unit comprising a coil disposed between the first lens barrel and the second lens barrel adjacent to the first lens barrel, and configured to adjust the first lens barrel; a second coil unit comprising a second coil disposed between the first lens barrel and the second lens barrel adjacent to the second lens barrel and configured to adjust the second lens barrel; and a magnet disposed between the first coil unit and the second coil unit and configured to provide magnetic force to each of the first and second coils.

18 Claims, 33 Drawing Sheets

(51) Int. Cl.

| | |
|---|---|
| ***G02B 13/00*** | (2006.01) |
| ***G02B 7/08*** | (2006.01) |
| ***G03B 3/10*** | (2006.01) |
| ***G02B 27/64*** | (2006.01) |
| ***H02K 41/035*** | (2006.01) |

(52) U.S. Cl.
CPC ................ *G03B 2205/0015* (2013.01); *G03B 2205/0069* (2013.01)

(56) References Cited

U.S. PATENT DOCUMENTS

| | | | | |
|---|---|---|---|---|
| 2017/0315376 | A1* | 11/2017 | Hu | G02B 27/646 |
| 2017/0336699 | A1* | 11/2017 | Hu | G02B 7/09 |
| 2018/0003918 | A1* | 1/2018 | Hu | G02B 7/023 |
| 2018/0031860 | A1* | 2/2018 | Bachar | G02B 13/003 |
| 2018/0100984 | A1* | 4/2018 | Wu | G02B 7/023 |

* cited by examiner

CAMERA MODULE HAVING LENS BARREL

CROSS-REFERENCE TO RELATED APPLICATION

This application is based on and claims priority under 35 U.S.C. § 119 to Korean Patent Application Serial No. 10-2017-0020331, which was filed in the Korean Intellectual Property Office on Feb. 15, 2017, the content of which is incorporated by reference herein in its entirety.

TECHNICAL FIELD

The present disclosure relates generally to a dual camera module.

BACKGROUND

Generally, a portable device has been provided with two camera modules in order to install a dual camera module in a body housing. One camera module may require one coil and one magnet, and two camera modules may require two coils and two magnets. One coil and one magnet comprise one driving unit and another coil and another magnet comprise another driving unit such that each of the driving units is configured to provide a force for moving a corresponding lens barrel.

However, when two camera modules are installed in respective body housings of an electronic device having a limited size, the mounting volume of the body housing may be increased. Furthermore, since the camera module requires two components, namely camera modules, manufacturing costs may increase.

SUMMARY

Various example embodiments of the present disclosure provide a dual camera module that minimizes and/or reduces the size of the camera module by providing a configuration in which the driving units of two camera modules share one magnet.

Various example embodiments of the present disclosure provide an electronic device having a dual camera module that can reduce manufacturing costs by providing a configuration in which the driving units of the two camera modules share one magnet.

According to various example embodiments of the present disclosure, a dual camera module is provided, the dual camera module, may include a housing; at least one image sensor disposed in the housing; a first lens barrel including at least one first lens and disposed in a first portion of the housing facing a first portion of the at least one image sensor; a second lens barrel including at least one second lens disposed in a second portion of the housing facing a second portion of the at least one image sensor; a first coil unit comprising a first coil disposed between the first lens barrel and the second lens barrel and adjacent to the first lens barrel, the first coil unit configured to adjust the first lens barrel; a second coil unit comprising a second coil disposed between the first lens barrel and the second lens barrel and adjacent to the second lens barrel, the second coil unit configured to adjust the second lens barrel; and a magnet disposed between the first coil unit and the second coil unit, the magnet configured to provide magnetic force to each of the first and second coils.

According to various example embodiments, an electronic device may include: a housing including a first face facing a first direction, a second face facing a second direction opposite the first direction, a third face facing a direction perpendicular to each of the first and second directions and surrounding at least a portion of a space between the first and second faces; and a dual camera module installed on any one of the first to third faces of the housing. The dual camera module may include a commonly shared single magnet, a first coil unit comprising a first coil disposed to face one face of the single magnet, and a second coil unit comprising a second coil disposed to face another surface of the single magnet. The first lens barrel may be configured to be movable by a first driving unit including the single magnet and the first coil unit and the second lens barrel may be configured to be movable by a second driving unit including the single magnet and the second coil unit.

Various embodiments of the present disclosure can minimize and/or reduce the size of a dual camera module and can reduce the manufacturing cost of the dual camera module.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1A:
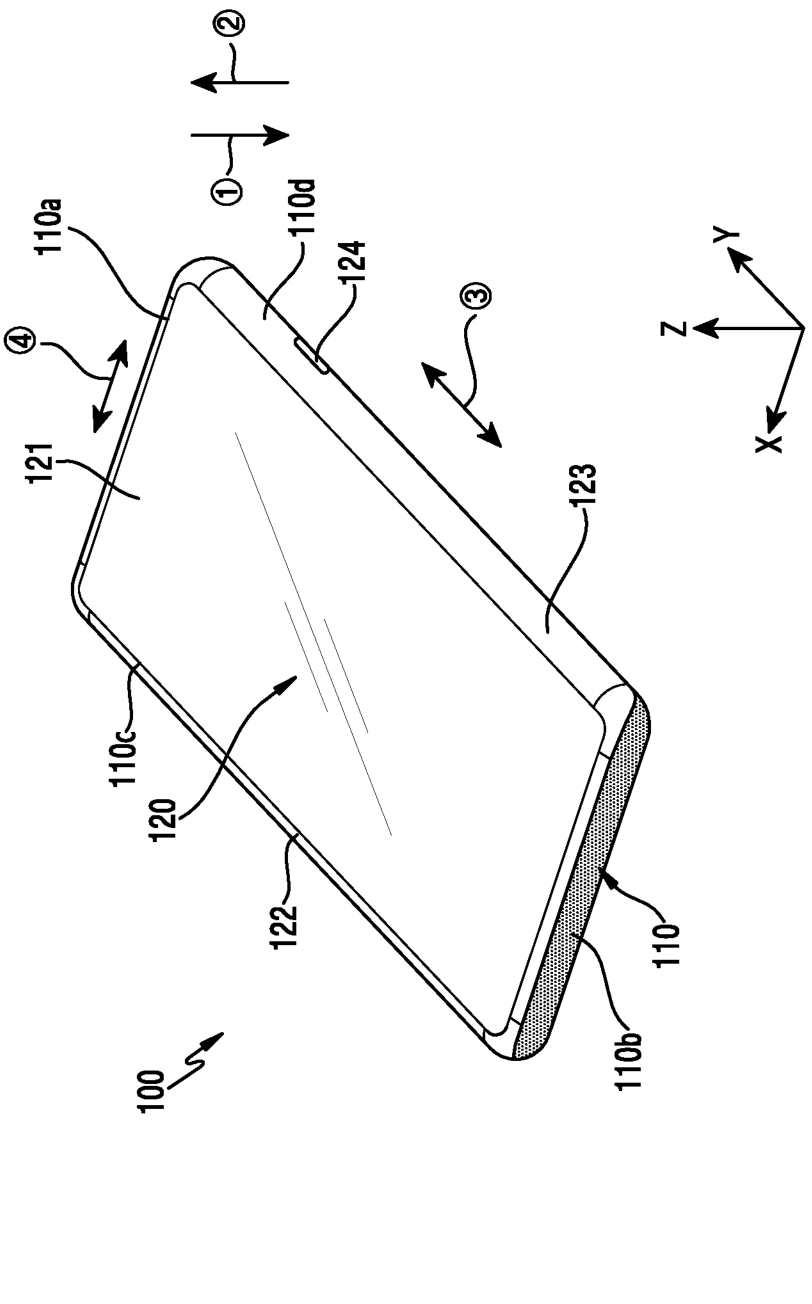
FIG. 1A is a perspective view illustrating a front face of an example electronic device according to various example embodiments.

Hereinafter, various example embodiments of the present disclosure will be described in connection with the accompanying drawings. The present disclosure may have various embodiments, and modifications and changes may be made therein. Therefore, the present disclosure will be described in detail with reference to particular embodiments illustrated in the accompanying drawings. However, it should be understood that the present disclosure is not limited to the particular embodiments, but includes all modifications, equivalents, and/or alternatives within the spirit and scope of the present disclosure. In the description of the drawings, similar reference numerals may be used to designate similar elements.

Herein, the expressions "include", "may include" and other conjugates refer to the existence of a corresponding disclosed function, operation, or element, and do not limit one or more additional functions, operations, or elements. Further, "have", and their conjugates merely denote a certain feature, numeral, step, operation, element, component, or a combination thereof, and do not exclude the existence or possibility of addition of one or more other features, numerals, steps, operations, elements, components, or combinations thereof.

The expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. Accordingly, a first element may be referred to as a second element, and likewise a second element may also be referred to as a first element, without departing from the scope of embodiments of the present disclosure.

When an element is referred to as being "coupled" or "connected" to any other element, it should be understood that not only may the element be coupled or connected directly to the other element, but also a third element may be interposed therebetween. On the other hand, when an element is referred to as being "directly coupled" or "directly connected" to any other element, it should be understood that no other element is interposed between the two elements.

The terms herein are used merely to describe one or more example embodiments and are not intended to limit the present disclosure. As used herein, singular forms may include plural forms as well, unless the context explicitly indicates otherwise. Further, all terms used herein, including technical and scientific terms, have the same meaning as commonly understood by those of skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in herein.

An electronic device according to the present disclosure may be a device including a communication function. For example, the electronic device may include at least one of a Smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g. a head-mounted-device, such as electronic glasses, electronic clothes, an electronic bracelet, an electronic necklace, an electronic appcessory, electronic tattoos, or a smartwatch), or the like, but is not limited thereto.

The electronic device may also be a smart home appliance with a communication function such as a television, a digital versatile disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame, or the like, but is not limited thereto.

The electronic device may also include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM), and a point of sale (POS) device, or the like, but is not limited thereto.

The electronic device may also include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto.

Further, the electronic device may be a flexible device.

The electronic device may also be a combination of one or more of the aforementioned various devices. Further, it will be apparent to those skilled in the art that the electronic device, according to the present disclosure, is not limited to the aforementioned devices.

Herein, the term "user" in may refer, for example, to a person who uses an electronic device or a device (e.g., an artificial intelligence electronic device) that uses an electronic device.

Figure 1B:
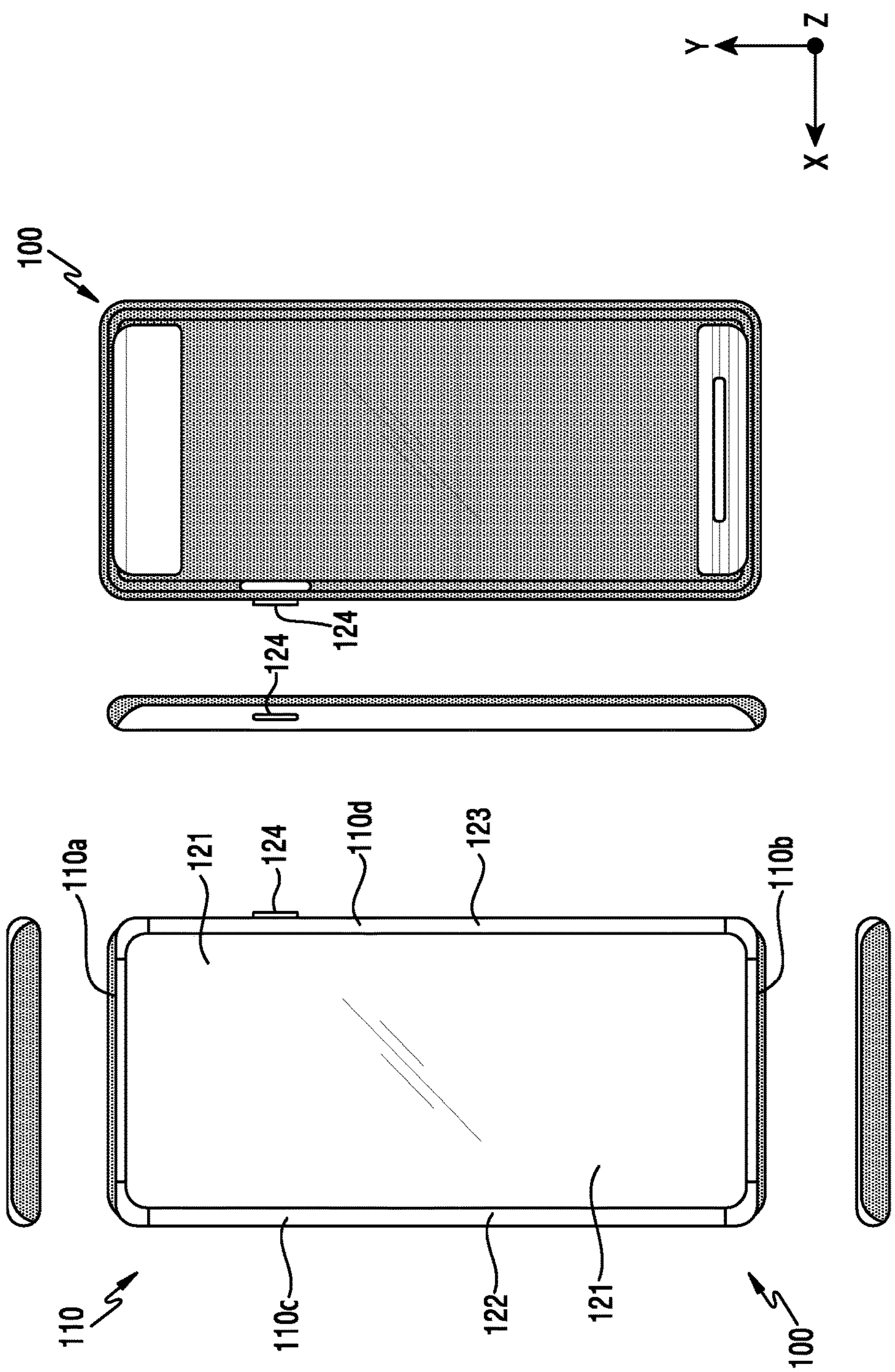
FIG. 1B is a diagram illustrating a front view, a rear view, a top view, a bottom view, a left side view, and a right sight view of the electronic device according to various example embodiments.

FIG. 1A is a perspective view illustrating a front face of an example electronic device according to various example embodiments, and FIG. 1B illustrates a front view, a rear view, a top view, a bottom view, a left side view, and a right sight view of the electronic device according to various example embodiments. An orthogonal coordinate system is used, in which an X-axis direction may refer, for example, to the transverse direction of the electronic device, a Y-axis direction may refer, for example, to the longitudinal direction of the electronic device, and a Z-axis direction may refer, for example, to the thickness direction of the electronic device.

Referring to FIGS. 1A and 1B, an electronic device 100 according to various embodiments may include a housing 110 that provides the external appearance of an electronic device 100 and protects electronic components of the electronic device 100. The housing 110 according to various embodiments may include a first face facing a first direction ①, a second face facing a second direction ②, which is opposite the first direction ①, and may include a side face facing a lateral direction, which is perpendicular to the first and second directions ① and ② and at least partially encloses a space between the first and second faces. The lateral direction may include a third direction ③, a fourth direction ④, or both the third and fourth directions ③and ④.

In the housing 110 according to various embodiments, when the first direction ① faces upward, the first face may be the top face of the housing, and when the second direction ② faces downward, the second face may be the bottom face of the housing. In the housing 110 according to various embodiments, for example, when the first direction ① faces upward, the first face may be the front face of the housing, and when the second direction ⓪ faces downward, the second face may be the rear face of the housing.

According to various embodiments, the housing 110 may include a plurality of side faces. For example, the side faces may include a side face on the upper edge 110*a* of the housing 110, a side face on the lower edge 110*b* of the housing, a side face on the left edge 110*c* of the housing, and a side face on the right edge 110*d* of the housing. The upper edge 110*a*, the lower edge 110*b*, the left edge 110*c*, and the right edge 110*d* may together form a rim or a perimeter of the electronic device 100.

The electronic device 100 according to various embodiments may include a display 120. The display 120 according to various embodiments may include a flat display 121 and at least one curved display 122 disposed at an edge region of the flat display 120.

The display 120 according to various embodiments may include the flat display 121, which is disposed in at least a portion of the first face to be exposed, and at least one curved display 122, which extends from the flat display 121 and is disposed in at least a portion of a side face of the housing 110 to be exposed.

In the flat display 120 according to various embodiments, first and second curved displays 122 and 123 may be disposed at peripheral portions, that is, edge regions. Although the first and second curved displays 122 and 123 are illustrated as being disposed at the left and right edges of the flat display 121 in the present embodiment, the curved displays may be disposed in various edges without being limited to the positions described above.

For example, the curved display 122 may be disposed at the upper edge 110*a*, the lower edge 110*b*, the left edge 110*c*,the right edge 110*d* of the housing, may be disposed at each of the upper and lower edges 110*a* and 110*b* of the housing, or may be disposed at each of left and right edges 110*c* and 110*d* of the housing, or the upper, lower, left, and right edges 110*a*,110*b*, 110*c*, and 110*d* of the housing. FIG. 1A and FIG. 1B illustrate a configuration in which the first and second curved displays 122 are disposed at the left and right edges 110*c* and 110*d* of the flat display 121, respectively. In addition, the upper and lower edges 110*a* and 110*b* where the first and second curved displays 122 and 123 are not disposed may include a portion of the housing, which is comprised of a metal. For example, the portion of the housing, which is made of a metal, may be an outer metal frame, and may operate as an antenna radiator by being separated by an insulator.

Although not illustrated in the drawings, a receiver for receiving the voice of a counterpart may be disposed at the upper edge 110*a* of the flat display 121 according to various embodiments. At the lower edge of the flat display 121, a microphone for transmitting the voice of the user of the electronic device to the counterpart may be disposed.

In the housing 110 according to various embodiments, components may be disposed for performing various functions of the electronic device 100. The components may include at least one sensor module. Such a sensor module may include at least one of an illuminance sensor (e.g., a light sensor), a proximity sensor (e.g., a light sensor), an infrared sensor, and an ultrasonic sensor. According to one embodiment, the components may include a front camera. The electronic components may be disposed at appropriate positions in the housing 110.

The display 120 according to various embodiments may be formed as a full display screen so as to occupy the greater part of the front face of the electronic device 100. A main home screen is the first screen that is displayed on the display 120 when the power of the electronic device 100 is turned on. When the electronic device 100 has several pages of different home screens, the main home screen may be the first home screen among the several pages of home screens. The home screen may display shortcut icons to execute frequently used applications, a main menu switching key, time, weather, or the like.

Various electronic components may be disposed at the lower edge 110*b* of the housing according to various embodiments. For example, a microphone, a speaker, an interface connector, and an ear jack hole may be disposed in the lower outer metal frame.

Various electronic components may be disposed at the upper edge 110*a* according to various embodiments. For example, a socket device configured to insert a card-shaped external device thereinto may be disposed at the upper edge 110*a*. The socket device may accommodate at least one of a unique ID card (e.g., a SIM card, a USIM card, etc.) for the electronic device, and a memory card for expanding a storage space. An infrared sensor module may be disposed on one side of the socket device, and an auxiliary microphone device may be disposed on one side of the infrared sensor module.

At least one first side key button 124 may be disposed in the second curved display 123 according to various embodiments. The side key button 124 may perform a power on/off function, a wake-up/sleep function, and the like of the electronic device.

A rear camera (not illustrated) may be disposed on the rear face of the electronic device 100 according to various embodiments, and at least one electronic component may be disposed on one side of the rear camera. For example, the electronic components may include at least one of an illuminance sensor (e.g., an optical sensor), a proximity sensor (e.g., an optical sensor), an infrared sensor, an ultrasonic sensor, a heart-rate sensor, and a flash device.

According to various embodiments, the electronic device 100 may selectively display information by controlling a display module. For example, the electronic device 100 may comprise a screen only on the flat display 121 by controlling the display module. The electronic device 100 may control the display module to configure the screen including any one of the first and second curved displays 121 and 123 together with the flat display 121. The electronic device 100 may control the display module to configure the screen using only at least one of the first and second curved displays 122 and 123 other than the flat display 121.

Figure 2:
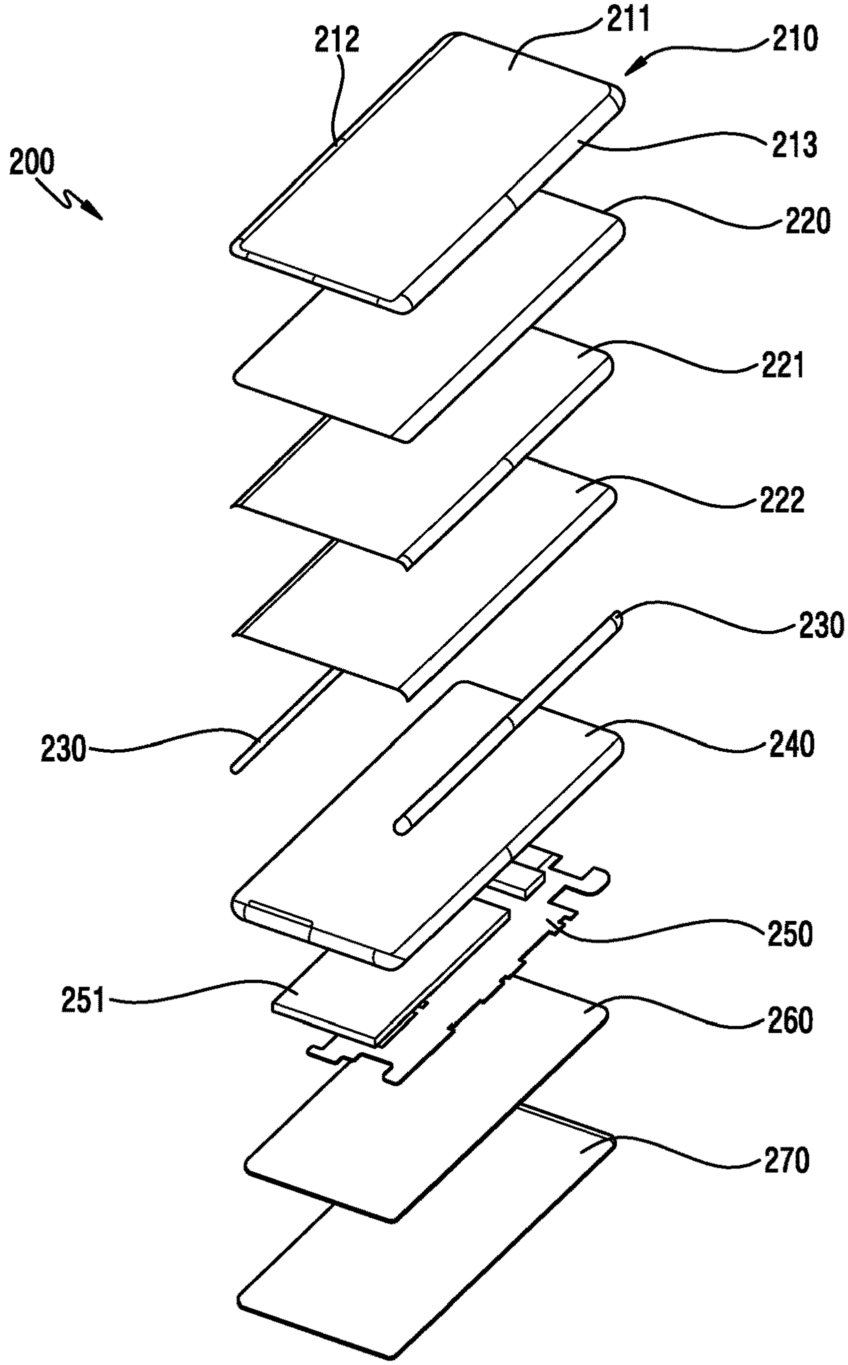
FIG. 2 is an exploded perspective view illustrating an example internal configuration of the electronic device according to various example embodiments.

FIG. 2 is an exploded perspective view illustrating an example electronic device according to various example embodiments. The electronic device 200 according to various embodiments may be at least partially or wholly the same as the electronic device 100 illustrated in FIG. 1.

Referring to FIG. 2, the electronic device 200 according to various embodiments may include a first transparent member 210, a display 220, a support structure 240, a support member 230, a PCB 250, a battery pack 251, a housing 260, and a second transparent member 270.

The battery pack 251 according to various embodiments is seated in an accommodation space formed in the housing 260, and may be disposed while avoiding the PCB 250. According to an example embodiment, the battery pack 251 and the PCB 250 may, for example, and without limitation, be arranged in a parallel manner without overlapping.

The display 220 according to various embodiments may be secured to one face of the support structure 240, and the first transparent member 210 may be fixed in the manner of being attached to the display. The second transparent member 270 according to various embodiments may be fixed in the manner of being attached to the housing 260 by a second adhesive member.

The first transparent member 210 according to various embodiments may, for example, be made of a synthetic resin or glass, and includes a flat portion 211, as well as a left bent portion 212 and a right bent portion 213, which are bent in the opposite directions in the flat portion 211. According to an example embodiment, although there is illustrated a shape in which the left and right bent portions 212 and 213 are formed in a 3D manner, a shape in which the upper and lower portions are bent or a shape in which the upper, lower, left, and right portions are bent may be applied in addition to the shape in which the left and right portions are bent. According to one embodiment, the first transparent member 210 may further include a touch panel on the rear face thereof, which may receive a touch input signal from the outside.

The display 220 according to various embodiments may be formed in a shape corresponding to the first transparent member 210 (a shape having a corresponding curvature). According to an example embodiment, since the display 220 has been described above in detail with reference to FIGS. 1A and 1B, a detailed description thereof will not be repeated here.

The first adhesive member 221 according to various embodiments may be a component for fixing the display 220 to, for example, a copper sheet 222 disposed within the electronic device, and may be a piece of adhesive tape such as a piece of double-sided tape, or a liquid adhesive layer such as a bonding agent. For example, when the double-sided tape is applied as the first adhesive member 221, an inner substrate made of a general polyethylene terephthalate (PET) material may be applied, and a functional substrate may be applied. For example, it is possible to increase impact resistance by using a piece of foam tape or a base material using an impact-resistant fabric, thereby preventing and/or reducing the front window from being damaged by an external impact.

According to various embodiments, the support structure 240 may be disposed within the electronic device 200, and may be used as a component for increasing the overall rigidity of the electronic device. For example, at least one of Al, Mg, and STS may be used for the inner support structure 240. According to an example embodiment, for the inner support structure 240, a high-rigidity plastic containing glass fiber may be used, or a metal and a plastic may be used together. According to an example embodiment, when a metal member and a non-metal member are used together as the materials of the inner support structure 240, the inner support structure 240 may be formed in the manner of insert-molding a non-metal member on the metal member. The inner support structure 240 may be positioned on the rear face of the display module 220, may have a shape (curvature) similar to that of the rear face of the display module 230, and may support the display 220. According to one embodiment, between the inner support structure 240 and the display 230, sheets (such as an elastic member (e.g., sponge or rubber), an adhesive layer (e.g., double-sided tape), or a sheet (e.g., single-sided tape)) may be additionally disposed in order to protect the display 230.

The support structure 240 according to various embodiments may be fastened to a housing (e.g., a rear case) 260 and may create a space therein, in which at least one electronic component may be disposed. The electronic components may include a printed circuit board (PCB) 250. However, without being limited thereto, the present disclosure may include an antenna device, a sound device, a power supply device, a sensor device, and the like in addition to the PCB 250.

A battery pack 251 according to various embodiments may supply power to the electronic device 200. According to various embodiments, the battery pack 251 may be integrally disposed in the electronic device 200. However, without being limited thereto, when a rear housing 260 is implemented to be detachable from the electronic device 200, the battery pack 251 may be implemented to be detachable.

According to various embodiments, the housing 260 may form the exterior (e.g., the side face including a metal bezel) of the electronic device 200, and may be coupled with the support structure 240 so as to form an inner space. According to one embodiment, since the housing has been described above in detail with reference to FIG. 1A and FIG. 1B, a detailed description thereof will not be repeated here.

According to one embodiment, a second transparent member 270 may be applied in a form similar to that of the first transparent member 210. The first transparent member 210 may be referred to as a front window, and the second transparent member 270 may be referred to as a rear window.

The support member 230 according to various embodiments may be mounted in order to support the first and second curved displays located at the left and right edges of the display 220 by being fixed to the support structure 240. The support member 230 may be formed of an unbreakable material in the form of an elongated stick. The support member 230 may be disposed at least one edge region of the support structure 240.

Figure 3:
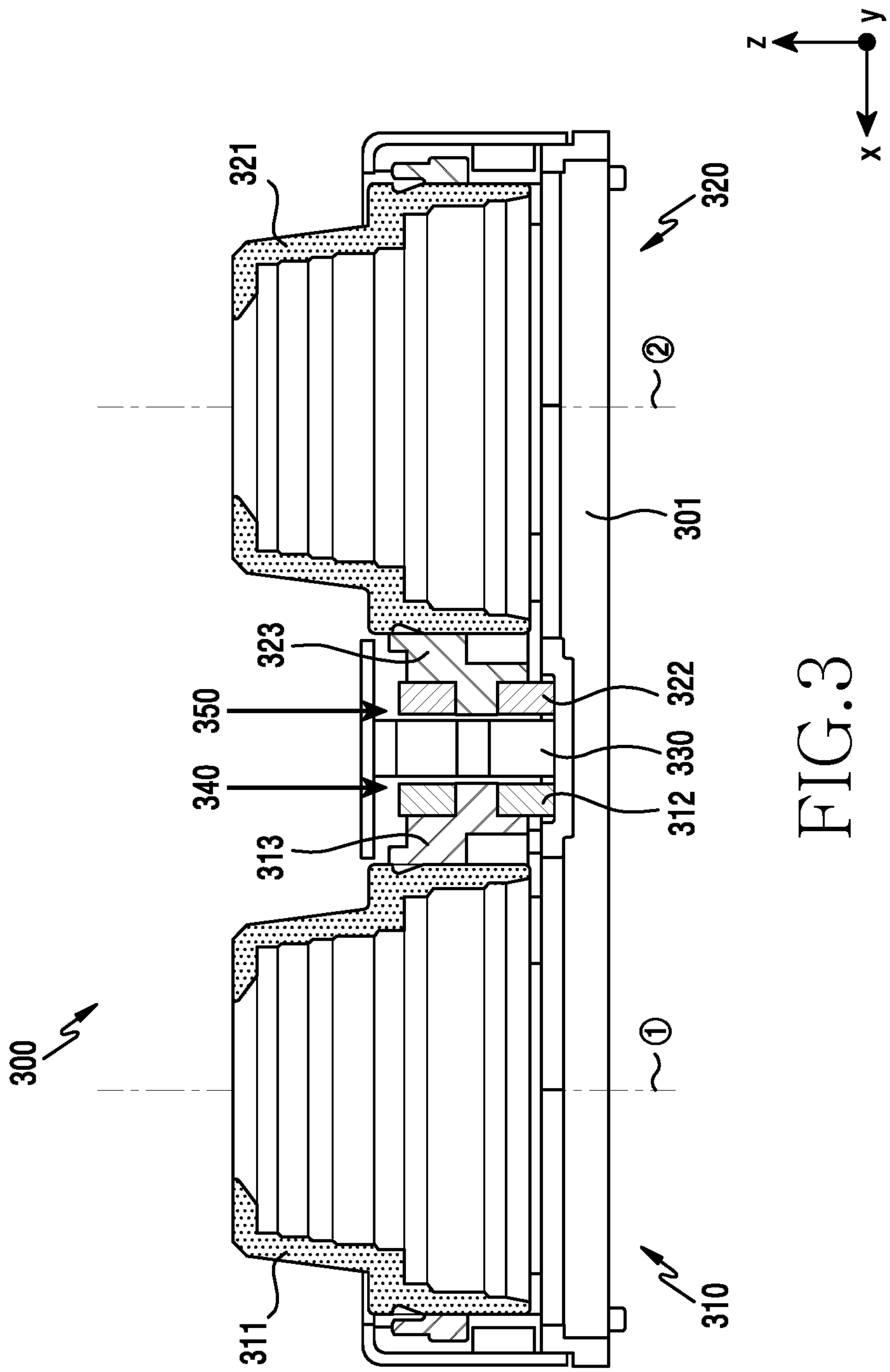
FIG. 3 is a cross-sectional view illustrating an example configuration of a dual camera module according to various example embodiments of the present disclosure.

FIG. 3 is a cross-sectional view illustrating an example configuration of a dual camera module according to various example embodiments of the present disclosure.

Referring to FIG. 3, the camera module 300 according to various embodiments is a dual camera module 300, and may be mounted in a first region of the first face of the electronic device 100 illustrated in FIG. 1A and FIG. 1B, or at least one camera module 300 may be mounted in the first region of the first face of the electronic device 100 or a second region of the second face of the electronic device 100. The dual camera module 300 according to various embodiments may be mounted in a non-display region or a display region of the electronic device 100. For example, the non-display region may be the rear face of the electronic device 100, and the display region may be the front face of the electronic device 100.

In the dual camera module 300 according to various embodiments, the first and second camera modules 310 and 320 may share a single magnet 330. For example, the first camera module 310 may include a first driving unit 340 that moves a first lens barrel 311 along a first optical axis ①, and the second camera module 320 may include a second driving unit 350 that moves a second lens barrel 321 along a second optical axis ②. The first driving unit 340 may include a first coil 312 and a single magnet 330 so as to generate a first electromagnetic force. The second driving unit 350 may include a second coil 322 and a single magnet 330 so as to generate a second electromagnetic force. A single magnet 330 may be disposed between and shared by the first and second coils 312 and 322.

The two mutually different first and second coil units 312 and 322 with the single magnet 330 interposed therebetween may generate mutual interference due to magnetic fields generated by current. Therefore, it is possible to drive the first coil unit 312 so as to compensate for the interference of the second coil unit 322 by detecting the magnitude of the magnetic field generated by the second coil unit 322 or the position of the second coil unit 322.

The magnitude of the magnetic field of the second coil unit 322 may, for example, be determined using a Hall sensor capable of measuring the magnetic field or from the magnitude and direction of the current flowing through the second coil unit 322. Since the magnitude and direction of the current are used to control the position of the corresponding coil, the current in the coil may also be associated with the position of the coil.

The control module for controlling the camera module can perform more accurate control by applying the current compensation amount of the first coil unit (a driving coil) 312 according to the magnitude and direction of the current in the second coil unit 322.

The dual camera module 300 according to various embodiments may be set such that, based on the current applied to the first coil unit 312, current is applied to the second unit 322 in a direction that partially cancels an attraction force or a repulsive force generated in the first coil unit 312 and the second coil unit 322.

The first coil unit 312 according to various embodiments may be disposed adjacent to the first lens barrel 311 between the first lens barrel 311 and the second lens barrel 321, and the second coil unit 322 may be disposed adjacent to the second lens barrel 322 between the first lens barrel 311 and the second lens barrel 321. The magnet 330 may be disposed between the first lens barrel 311 and the second lens barrel 321 or between the first coil unit 312 and the second coil unit 322.

The single magnet 330 according to various embodiments may be disposed between first and second optical axes ① and ②, between first and second carriers 313 and 323 or between the first and second coil units 312 and 322, and may be disposed to be upright on a base 301 in the same direction as the first and second optical axes ① and ②. The single magnet 330 may be in the form of a piece, and may have one face and another face. The first coil unit 312 may be disposed to face the one face, and the second coil unit 322 may be disposed to face another face.

The first coil unit 312 according to various embodiments may be disposed on the first carrier 313, the second coil 322 may be disposed on the second carrier 323, and a single magnet 330 may be fixed onto the base 301. For example, the first and second coils 312 and 322 may be respective moving bodies, and may be moved up and down along the first and second optical axes ① and ② by the electromagnetic force provided thereto. The single magnet 330 is a fixed body, and may be fixed by a support structure on the base 301.

Figure 4:
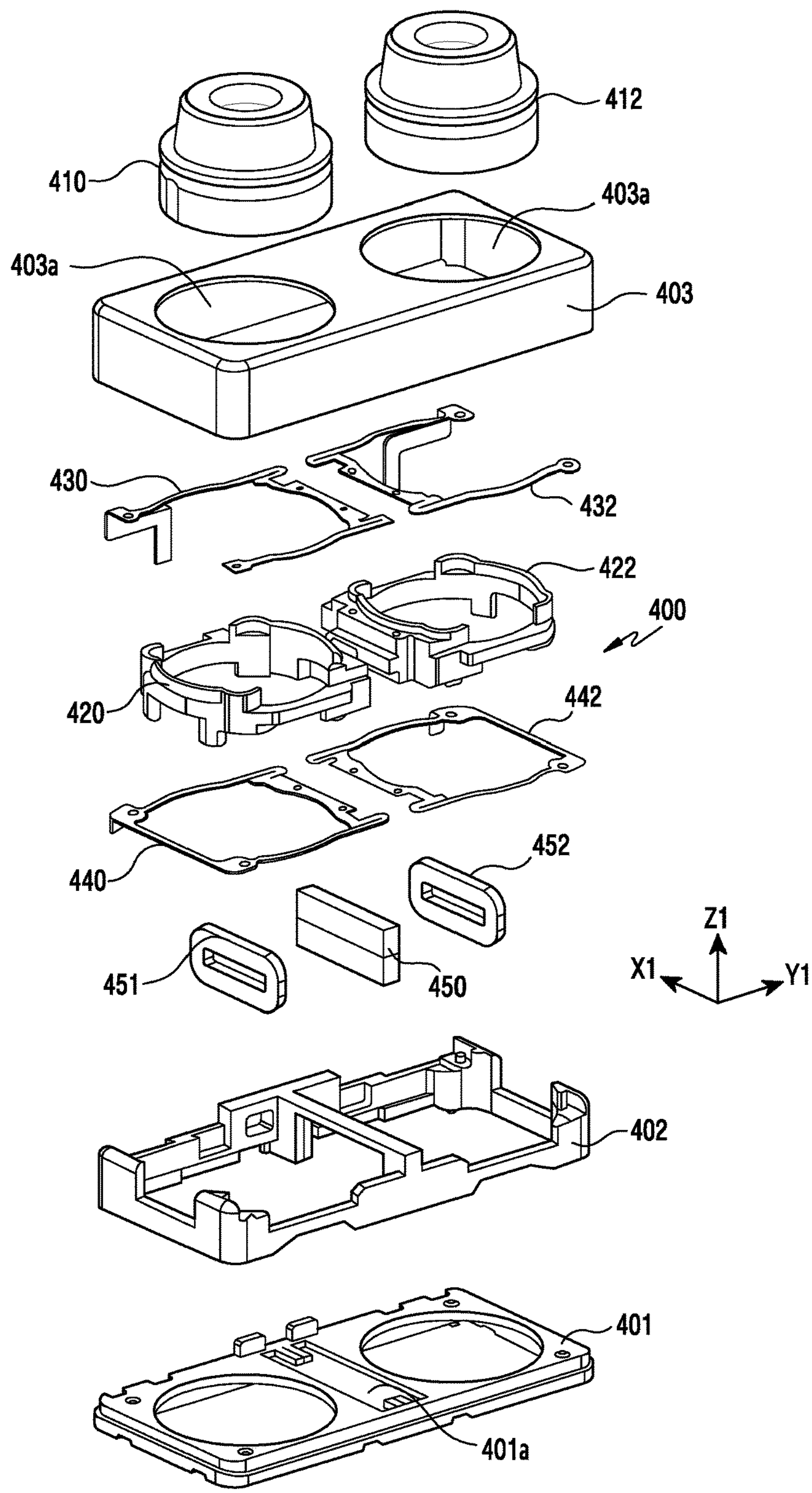
FIG. 4 is an exploded perspective view illustrating an example configuration of a dual camera module according to various example embodiments of the present disclosure.

FIG. 4 is an exploded perspective view illustrating an example configuration of a dual camera module according to various example embodiments of the present disclosure.

Referring to FIG. 4, according to various embodiments, a dual camera module 400 may be at least partly or entirely the same as the dual camera module 300 illustrated in FIG. 3. According to various embodiments, the dual camera module 400 may include a housing (401+402+403), first and second lens barrels 410 and 412, first and second carriers 420 and 422, first and second coil units 451 and 452, a single magnet 450, first upper and lower springs 430 and 440, second upper and lower springs 432 and 442, and the like.

The housing according to various embodiments may include a base 401, a cover 403, and a support structure 402. The base 401 according to various embodiments may include a support frame disposed in the lower end of the dual camera module, and a first printed circuit board (not illustrated) and a first image sensor (not illustrated) may be disposed on the base 401. The base 401 may be formed with a mounting recess 401*a* such that the magnet 450 and at least a portion of the support structure 402 are mounted therein.

However, the mounting position of the single magnet 450 is not necessarily limited to the mounting recess 401*a* of the base 401, and the magnet 450 may be seated on at least one of, for example, a cover 403, the support structure 402, and the base 401. For example, the first and second coils 451 and 452 may be mounted on the moving body of the electronic device, and the single magnet 450 may be mounted on the fixed body of the electronic device.

The cover 403 according to various embodiments may be vertically coupled to the base 401 in order to protect the lens inside the cover 403 and to form the external appearance. For example, the upper portion of the cover 403 may include two openings 403*a*.

The first and second lens barrels 410 and 412 according to various embodiments may be configured as first and second lens housings which are respectively coupled to the first and second carriers 420 and 422 and are movable along the first and second optical axes, respectively. The first and second carriers 420 and 422 according to various embodiments may be arranged so as to be coupled with the first and second lens barrels 410 and 412 and to respectively move along the first and second optical axes within the housing. For example, the first and second carriers 420 and 422 may have first and second seating portions 420*a* and 422*a* for fixing the first and second coils units 451 and 452, respectively. Since the arrangement of the first and second coil units 451 and 452 and the single magnet 450 according to various embodiments has already been described with reference to FIG. 3, a description thereof will not be repeated here.

Each of the first and second carriers 420 and 422 according to various embodiments may be supported by elastic bodies on the upper and lower sides thereof. For example, the first carrier 420 may be elastically supported in the first optical axis direction by the first upper spring 430 and the first lower spring 440. The second carrier 422 may be elastically supported by the second upper spring 432 and the second lower spring 442 in the direction of the second optical axis. In addition, the first upper spring 430 may be configured as a first conductive member for electrically connecting the first coil unit 451 to a printed circuit board (not illustrated). To this end, a terminal portion may be provided in an end of the first upper spring 430. The second upper spring 432 may be configured as a second conductive member for electrically connecting the second coil unit 452 to a printed circuit board (not illustrated). To this end, a terminal portion may be provided in an end of the second upper spring 432. Each of the first and second upper springs 430 and 432 may be electrically connected to each other since the ends of the coils of the first and second coil units 451 and 452 are soldered to each other. The first and second coils 430 and 432, to which the first and second coil units 451 and 452 are respectively electrically connected, may be electrically connected to the printed circuit board. The first and second upper springs 430 and 432 are, for example, a first elastic unit, and may be formed in the shape of a leaf spring (or any other elastically deformable material). The first and second lower springs 440 and 442 are, for example, a second elastic unit, and may be formed in the shape of a leaf spring (or any other elastically deformable material). The first upper and lower springs 430 and 440 may be disposed between the housing and the first lens barrel 410, and the second upper and lower springs 432 and 442 may be disposed between the housing and the second lens barrel 412.

Figure 5A:
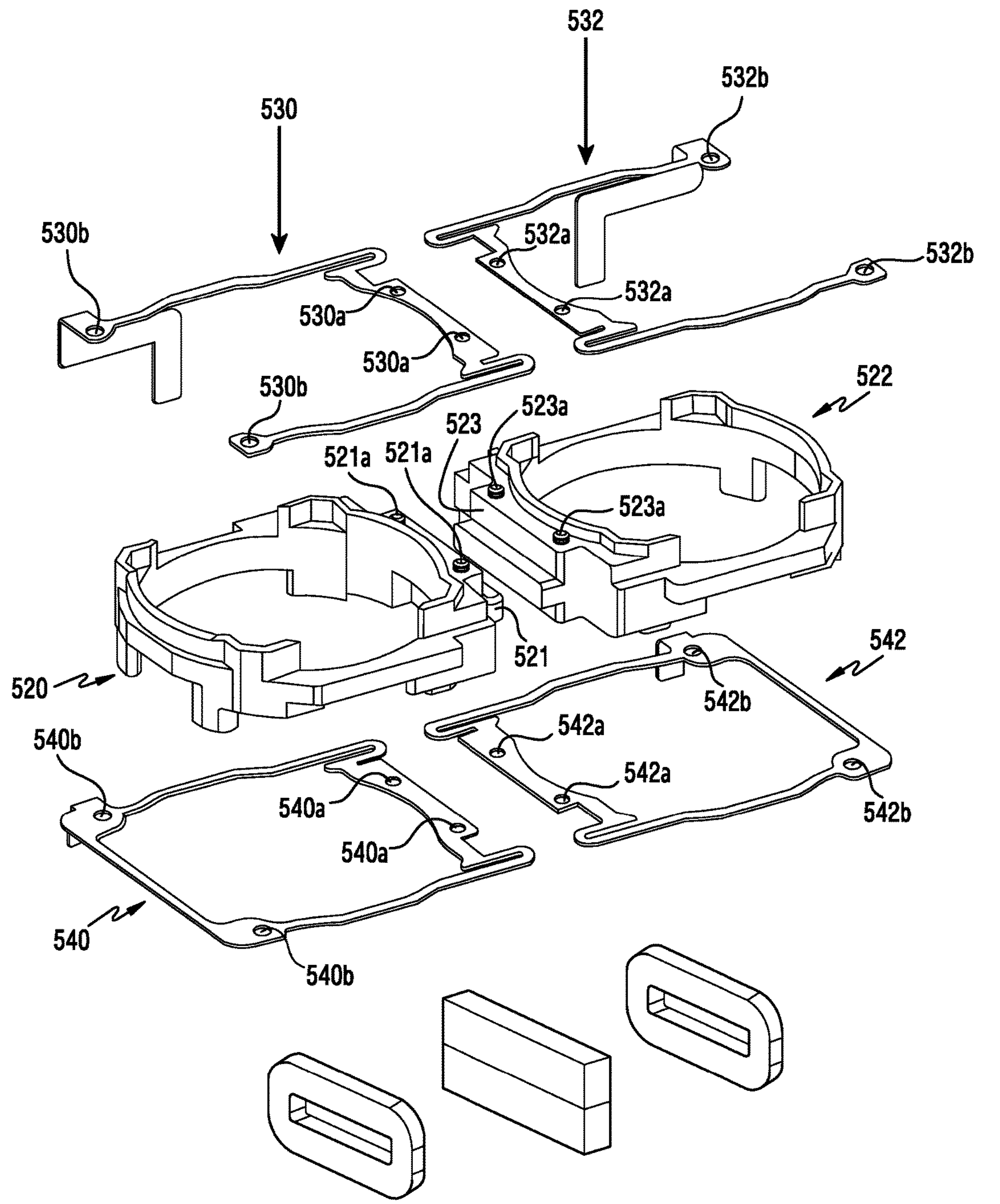
FIG. 5A is an exploded perspective view illustrating first and second upper and lower springs, which are respectively mounted on first and second carriers of a dual camera module according to various example embodiments of the present disclosure.
Figure 5B:
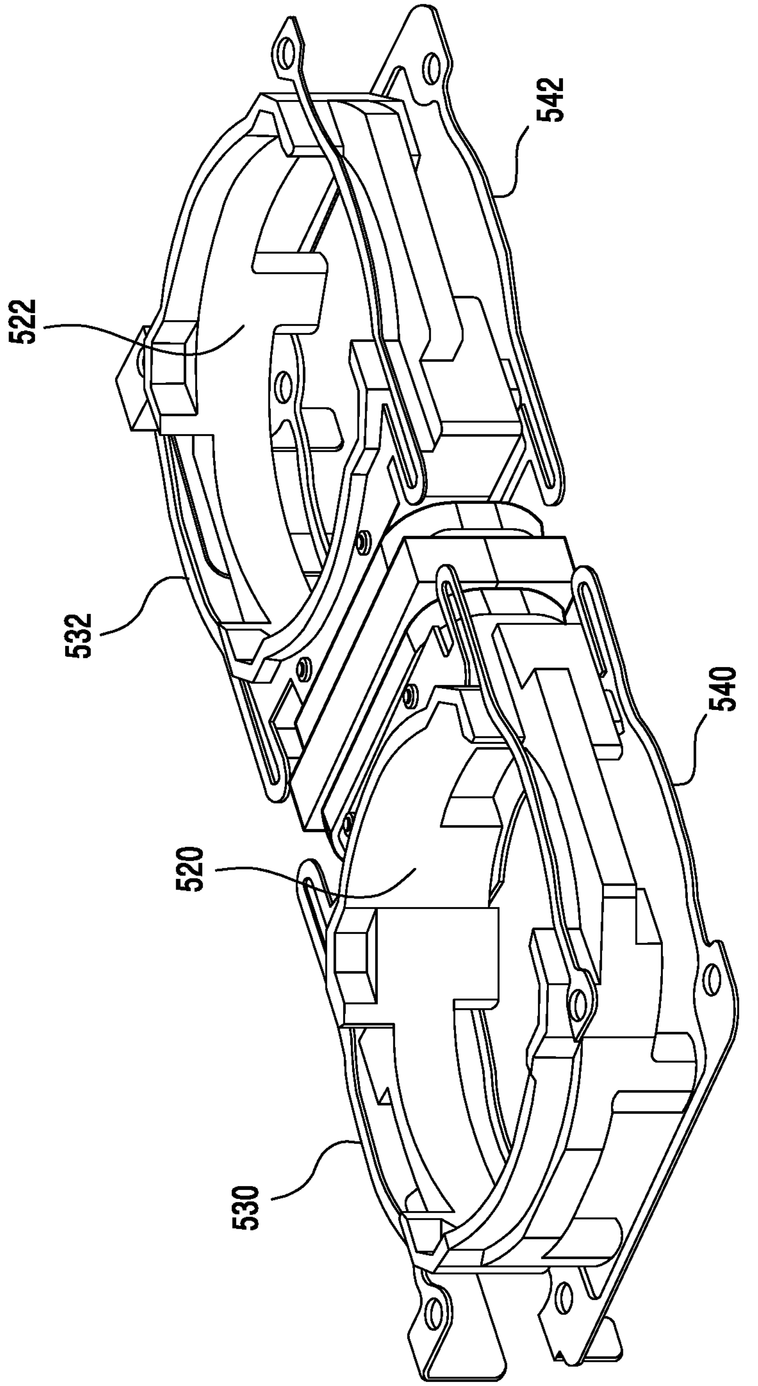
FIG. 5B is a perspective view illustrating an example state in which the first and second upper and lower springs are respectively mounted on the first and second carriers according to an example embodiment of the present disclosure.
Figure 5C:
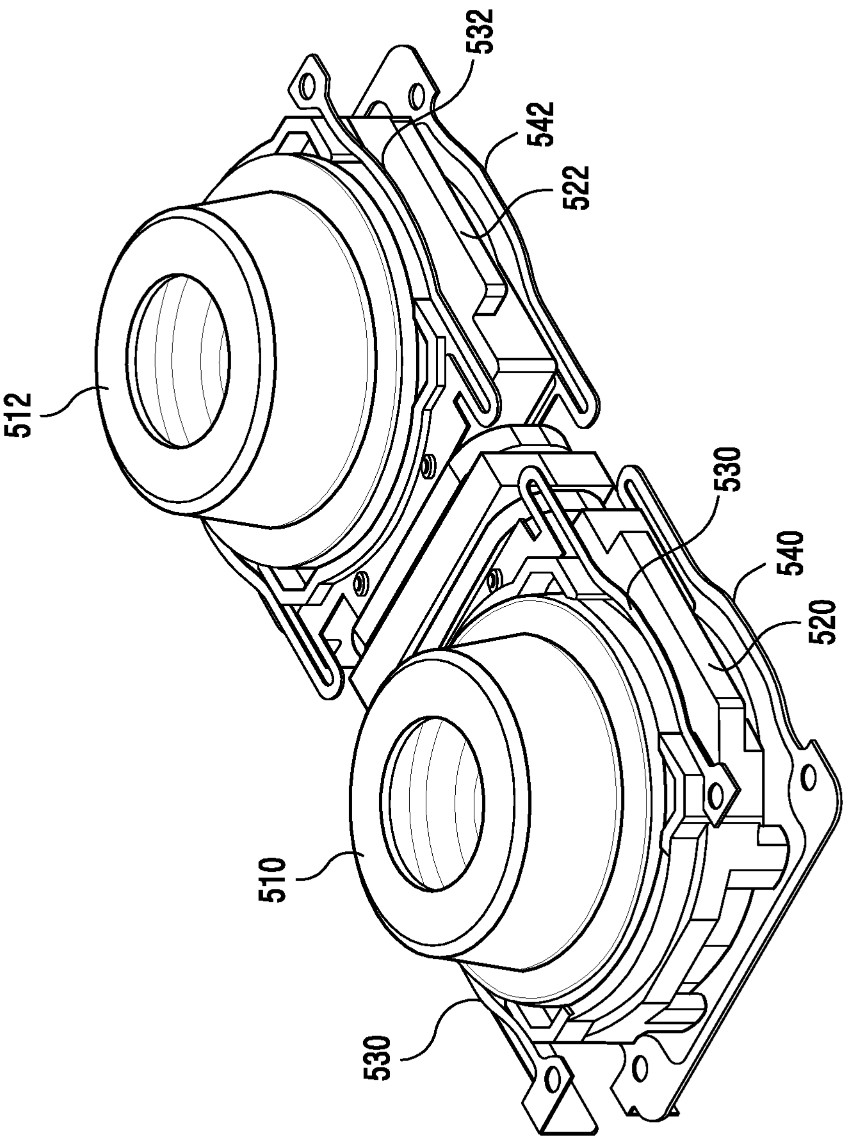
FIG. 5C is a perspective view illustrating an example state in which the first and second lens barrels are coupled to the first and second carriers, which are respectively assembled with the first and second upper and lower springs according to an example embodiment of the present disclosure.

FIG. 5A is an exploded perspective view illustrating first and second upper and lower springs, which are respectively mounted on first and second carriers of a dual camera module according to various example embodiments of the present disclosure, FIG. 5B is a perspective view illustrating a state in which the first and second upper and lower springs are respectively mounted on the first and second carriers according to various example embodiments of the present disclosure, and FIG. 5C is a perspective view illustrating a state in which the first and second lens barrels are coupled to the first and second carriers, which are respectively assembled with the first and second upper and lower springs according to various example embodiments of the present disclosure.

Referring to FIG. 5A, the first carrier 520 according to various embodiments may include at least one first coupling protrusion 521*a*, which may be formed in the vicinity of a first coil unit mounting portion 521. The second carrier 522 may include at least one second coupling protrusion 523*a*, which may be formed in the vicinity of a second coil unit mounting portion 523. For example, the first coupling protrusion 521*a* may be formed of two protrusions spaced from each other, and the second coupling protrusion 523*a* may be formed of two protrusions spaced from each other. The first and second coupling protrusions 521*a* and 523*a* may face each other or may be opposite each other.

The first upper spring 530 according to various embodiments may be a leaf spring and may be formed with at least one first coupling hole 530*a* that is coupled to the first coupling protrusion 521*a* of the first carrier 520 which is a moving body to be fixed to at least a portion of the first carrier 520. The second upper spring 532 may be a leaf spring and may be formed with at least one second coupling hole 532*a* that is coupled to the second coupling protrusion 532*a* of the second carrier 522 which is a moving body to be fixed to the second carrier 522.

In addition, the first lower spring 540 according to various embodiments may be formed with at least one coupling hole 540*a* that is coupled to the first coupling protrusion 521*a* of the first carrier 520 such that one side of the first lower spring 540 is fixed to the first carrier 520. The second lower spring 542 may be formed with at least one second coupling hole 542*a* that is coupled to the second coupling protrusion 523*a* of the second carrier 522 such that one side of the second lower spring 542 is fixed to the second carrier 522.

The first upper spring 530 according to various embodiments may be formed with at least one third coupling hole 530*b* to be fixedly coupled to the support structure, which is a fixed body. The second upper spring 532 may be formed with at least one fourth coupling hole 532*b* to be fixedly coupled to the support structure. In addition, the first lower spring 540 according to various embodiments may be formed with at least one third coupling hole 540*b* to be fixedly coupled to the support structure, which is the fixed body. The second lower spring 542 may be formed with at least one fourth coupling hole 542*b* to be fixedly coupled to the support structure.

According to such a coupling structure, the first carrier 520 can be moved along the first optical axis by a first electromagnetic force provided by a first driving unit in the state of being supported by the first upper and lower springs 530 and 540. The second carrier 522 can be moved along the first optical axis by a second electromagnetic force provided by a second driving portion in the state of being supported by the second upper and lower springs 532 and 542.

The coupling state of the first and second carriers 520 and 522 with the first upper and lower springs 530 and 540 and the second upper and lower springs 532 and 542 is illustrated in FIG. 5B. In addition, FIG. 5C illustrates a state in which the first and second lens barrels 510 and 512 are assembled with the first and second carriers 520 and 522 which are assembled with the first upper springs 530 and 540 and second lower springs 532 and 542.

Figure 6:
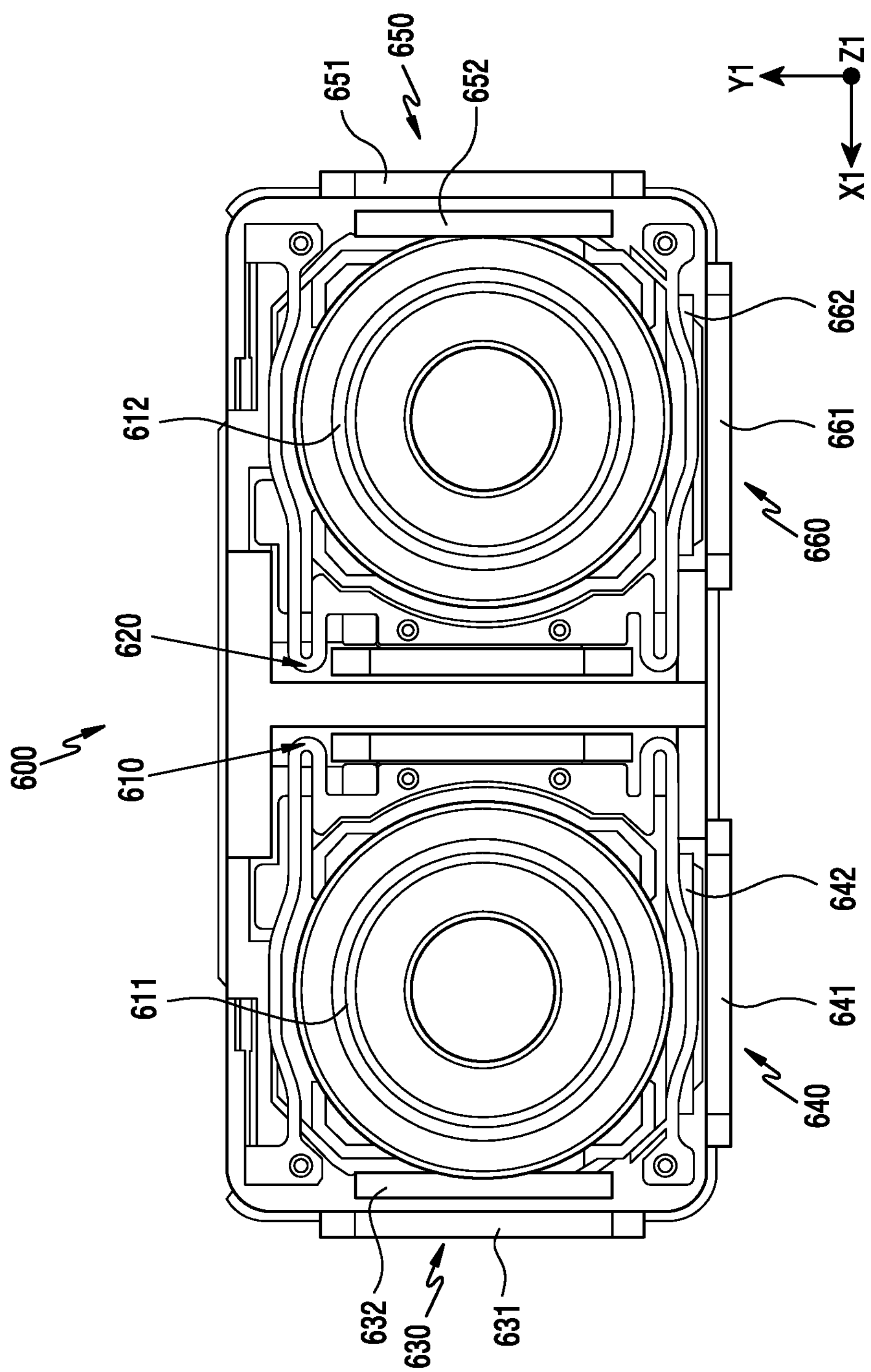
FIG. 6 is a top view illustrating an example dual camera module according to various example embodiments of the present disclosure.

FIG. 6 is a top view illustrating an example dual camera module according to various example embodiments of the present disclosure.

Referring to FIG. 6, in the dual camera module 600 according to various embodiments, a third driving unit 630 may be mounted at the periphery of the first camera module, for example, along a first side thereof such that a first lens barrel 611 can be moved in an X1-axis direction and a fourth driving unit 640 may be mounted along a second side such that the first lens barrel 611 can be moved in a Y1-ax is direction. The first and second sides may be perpendicular to each other. In addition, the third driving unit 630 may be disposed parallel to a first driving unit 610, and the fourth driving unit 640 may be disposed perpendicular to the first driving unit 610. For example, the third driving unit 630 may perform optical image stabilization (OIS) in the X1-axis direction, and the fourth driving unit 640 may perform OIS in the Y1-ax is direction.

In the dual camera module 600 according to various embodiments, a fifth driving unit 650 may be mounted at the periphery of the second camera module, for example, along a third side thereof such that that the second lens barrel 612 can be moved in an X2-axis direction, and a sixth driving unit 660 may be mounted along a fourth side such that the second lens barrel 612 be can move in the Y2-axis direction. The third and fourth sides may be perpendicular to each other. In addition, the third side may be disposed parallel to the first side and perpendicular to the second side, and the fourth side may be disposed perpendicular to the first side and parallel to the second side.

In addition, the third driving unit 630 may be disposed parallel to a first driving unit 610, and the fourth driving unit 640 may be disposed perpendicular to the first driving unit 610. For example, the third driving unit 630 may perform optical image stabilization (OIS) in the X2-axis direction, and the fourth driving unit 640 may perform OIS in the Y2-axis direction. The state of a first image of the dual camera module 600 according to various embodiments (an image captured by the first camera module) can be adjusted in accordance with the operation of the first driving unit 610 and the third and fourth driving units 630 and 640. The state of a second image of the dual camera module 600 according to various embodiments (an image captured by the second camera module) can be adjusted in accordance with the operation of the second driving unit 620 and the fifth and sixth driving units 650 and 660.

The third driving unit 630 according to various embodiments may include a third coil unit 631 and a third magnet 632, and the fourth driving unit 640 may include a fourth coil unit 641 and a fourth coil unit 642. The fifth driving unit 650 according to various embodiments may include a fifth coil unit 651 and a fifth magnet 652, and the sixth driving unit 660 may include a sixth coil unit 661 and a sixth magnet 662.

Figure 7A:
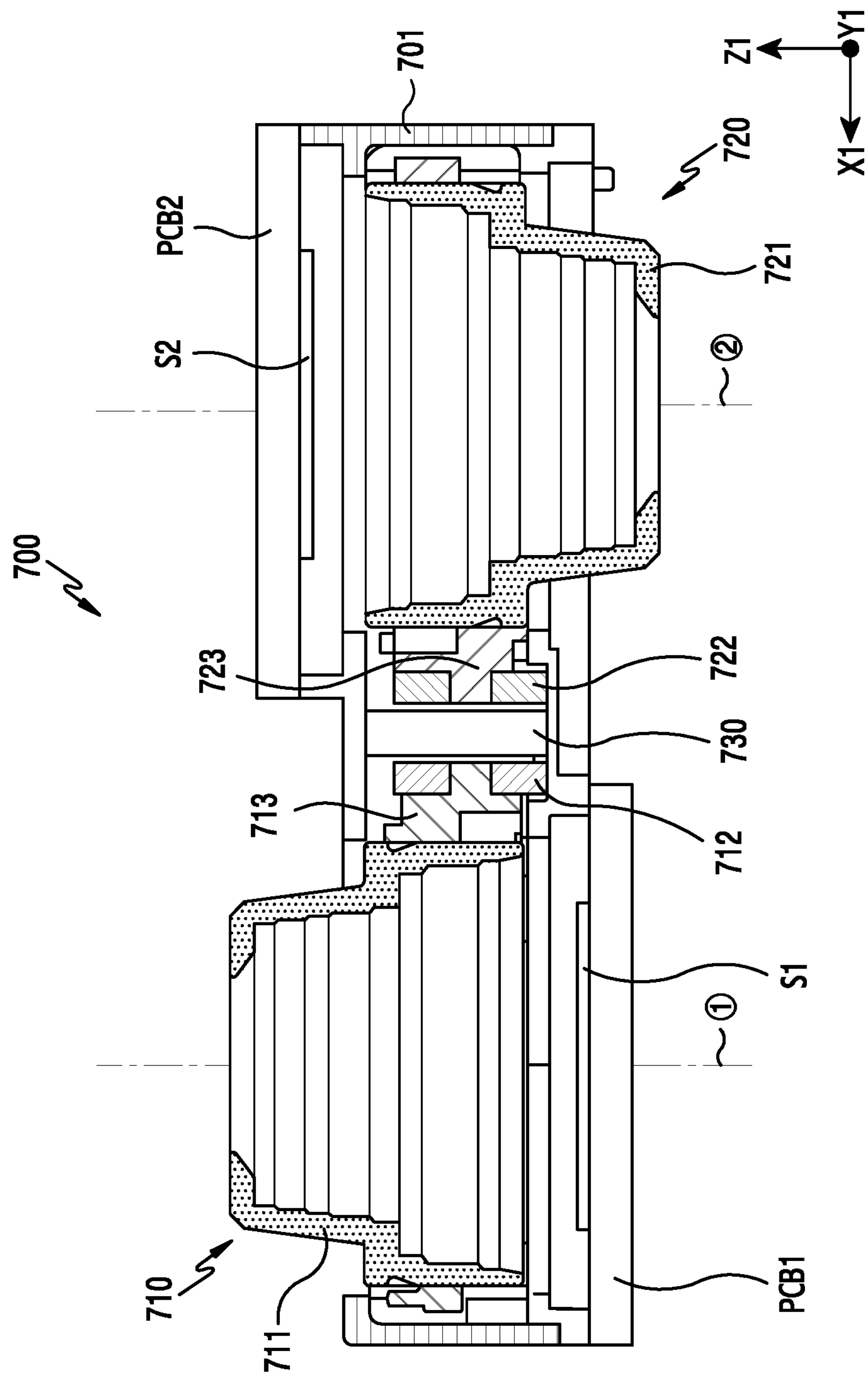
FIG. 7A is a cross-sectional view illustrating an example configuration of a dual camera module according to various example embodiments of the present disclosure.
Figure 7B:
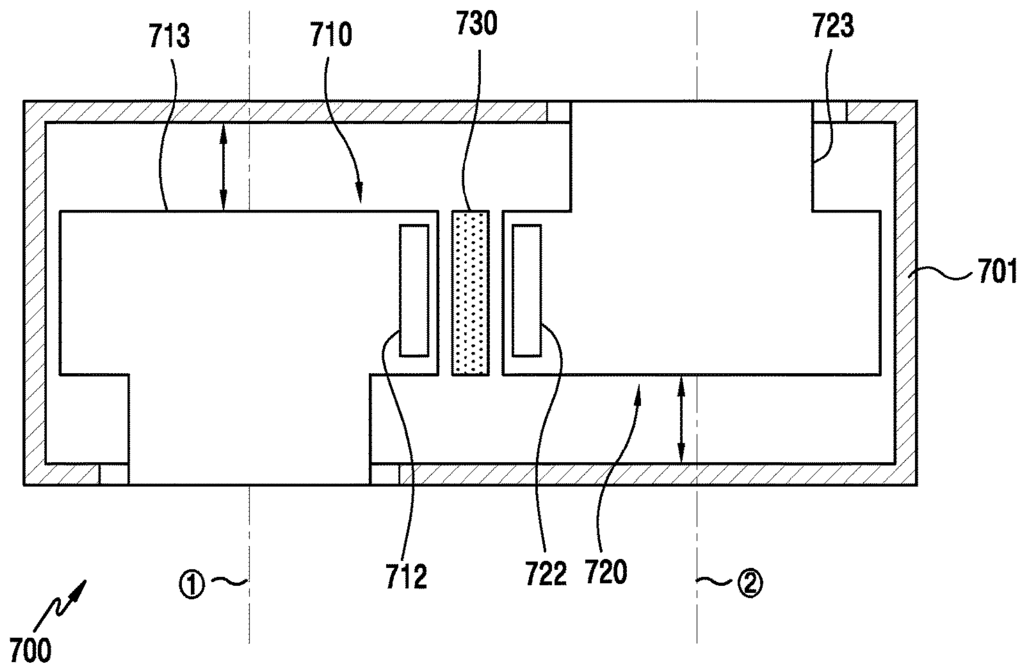
FIG. 7B is a diagram schematically illustrating the dual camera module according to an example embodiment of the present disclosure.

FIG. 7A is a cross-sectional view illustrating an example configuration of a dual camera module according to various example embodiments of the present disclosure, and FIG. 7B is a sectional view schematically illustrating the dual camera module.

Referring to FIGS. 7A and 7B, a dual camera module 700 according to various embodiments is a module having a structure in which a single magnet is shared, and may include a first camera module 710 in which a lens is disposed to be oriented in a first direction and a second camera module 720 in which a lens is disposed to be oriented in a second direction, which is opposite the first direction. The first direction may be a direction facing the front side of the electronic device, and the second direction may be a direction facing the rear side of the electronic device. For example, the first camera module 710 may be a front camera module facing the front of the electronic device, and the second camera module 720 may be a rear camera module facing the rear of the electronic device. Accordingly, the first camera module 710 may be disposed on the front face of the electronic device, e.g., the display region or the bezel region, and the second camera module 720 may be disposed on the rear cover of the electronic device.

The dual camera module 700 according to various embodiments may include a housing 701, a first camera module 710 disposed on one side of the housing 701, and a second camera module 720 disposed on the other side of the housing 701 and arranged parallel to the first camera module 710 such that the second camera module 720 does not overlap the first camera module 710 along the optical axis.

The dual camera module 700 according to various embodiments may include a first lens barrel 711 and a second lens barrel 721 disposed on the other side of the housing 701 parallel to the first lens barrel 711 such that the second lens barrel 721 does not overlap the first lens barrel 711. For example, the first lens barrel 711 may be disposed to face the first direction, and the second lens barrel 721 may be disposed to face the second direction. In addition, the first lens barrel 711 and the second lens barrel 721 may have the same shape and structure.

The first camera module 710 according to various embodiments may include a first driving unit that is configured with a first coil unit 712 and a single magnet 730. The second camera module 720 may include a second driving unit that is configured with a second coil unit 722 and a single magnet 730. For example, the single magnet 730 may be shared as the magnet of the first and second driving units. The first lens barrel 711 may be coupled to the first carrier 713 and moved along the first optical axis ① by the first driving unit, and the second lens barrel 721 may be coupled to the second carrier 723 and moved along the second optical axis ② by the second driving unit. The first and second optical axes ① and ② may be parallel to each other. Reference numeral PCB1 indicates a first printed circuit board, and reference numeral PCB2 indicates a second printed circuit board. Each of the first and second printed circuit boards may be composed of a flexible printed circuit board. Reference numeral S1 indicates a first image sensor, and reference numeral S2 indicates a second image sensor.

The first lens barrel 711 according to various embodiments may be disposed in a first portion of the housing in a state of facing the first portion of the first image sensor S1. The second lens barrel 721 may be disposed in a second portion of the housing in a state of facing the second portion of the second image sensor S2. For example, the first lens barrel 711 may include at least one first lens, and the second lens barrel 721 may include at least one second lens.

In the camera module 700 according to various embodiments, the first lens barrel 711 and the upper face of the first portion are formed to face the first direction so as to receive light from the first direction, and the upper face of the second lens barrel 721 and the second portion may be formed to face the second direction so as to receive light from the second direction, which is different from the first direction.

Figure 7C:
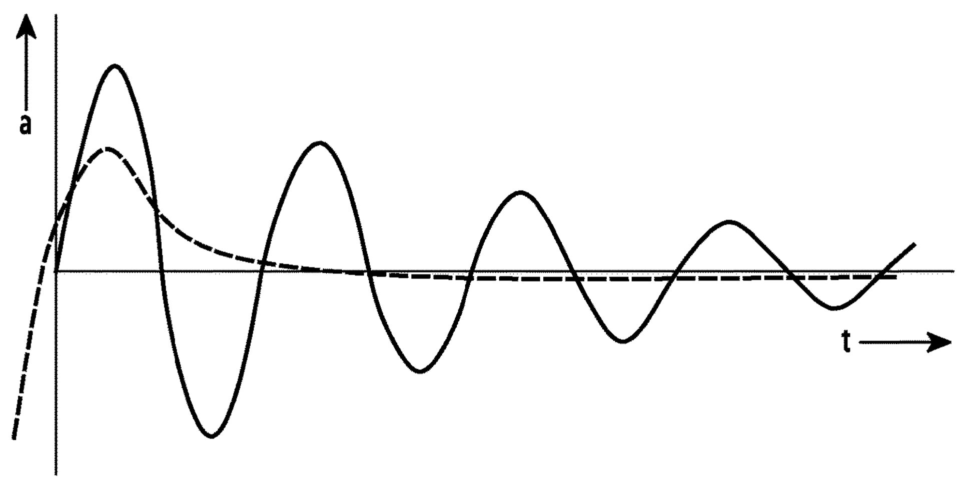
FIG. 7C is a graph illustrating an example stabilization time due to dampening of vibration resulting from a positional movement of the dual camera module according to various example embodiments of the present disclosure.

FIG. 7C is a graph illustrating an example stabilization time due to dampening of vibration resulting from positional movement according to an example embodiment of the present disclosure.

Referring to FIG. 7C, the camera modules according to various embodiments may take different spring constants so as to match the driving characteristics when the lens weights of the first and second camera modules are different from each other. Different weights and spring constants may cause to have different natural frequencies, and the control tuning values for adjusting the input current may be made different from each other according to the natural frequency in order to reduce the stabilization time due to the positional movement. The natural frequency of each of the first and second camera modules may be calculated using the following equation.

$$\omega=(k/m)^{1/2} \quad \text{[Equation 1]}$$

ω=natural frequency, k=spring constant, m=mass of a driving unit

When the input current of a coil is adjusted according to the natural frequency, the stabilization time can be reduced. In FIG. 7C, "a" represents amplitude and "t" represents time.

FIGS. 8, 9, 10 and 11 are cross-sectional views each illustrating an example configuration of a dual camera module according to various example embodiments of the present disclosure. In the dual camera module, first and second lens barrels may have the same configuration and may be symmetrically arranged in the housing, or may be asymmetrically arranged. Further, in the dual camera module, the first and second lens barrels may have different configurations, and may be arranged asymmetrically in the housing. In addition, the first and second lenses provided in the first and second lens barrels may be disposed to face the same direction, or may be disposed to face different directions, respectively.

The dual camera module according to various embodiments may include first and second lenses mounted in the first and second lens barrels, respectively. The first lens may be configured as a telephoto lens, and the second lens may be configured as a wide-angle lens. For example, a telephoto lens may be adopted as the first lens provided in the first lens barrel of each of the dual camera modules illustrated in FIGS. 8 to 11, and a wide-angle lens may be adopted as the second lens provided in the second lens barrel.

The dual camera module according to the various embodiments may adopt an image sensor capable of acquiring a color image by being equipped with a color filter, as a first image sensor mounted on the first camera module, and may adopt an image sensor capable of acquiring a monochrome image by being equipped with a monochrome filter, as a second image sensor mounted on the second camera module. For example, a color image sensor may be adopted as the first image sensor provided in the first camera module of each of the dual camera modules illustrated in FIGS. 8 to 11, and a monochrome image sensor may be adopted as the second image sensor provided in the second camera module.

The dual camera module according to the various embodiments may adopt a color image sensor as the first image sensor mounted on the first camera module, and may adopt an infrared sensor as the second image sensor mounted on the second camera module.

Figure 8:
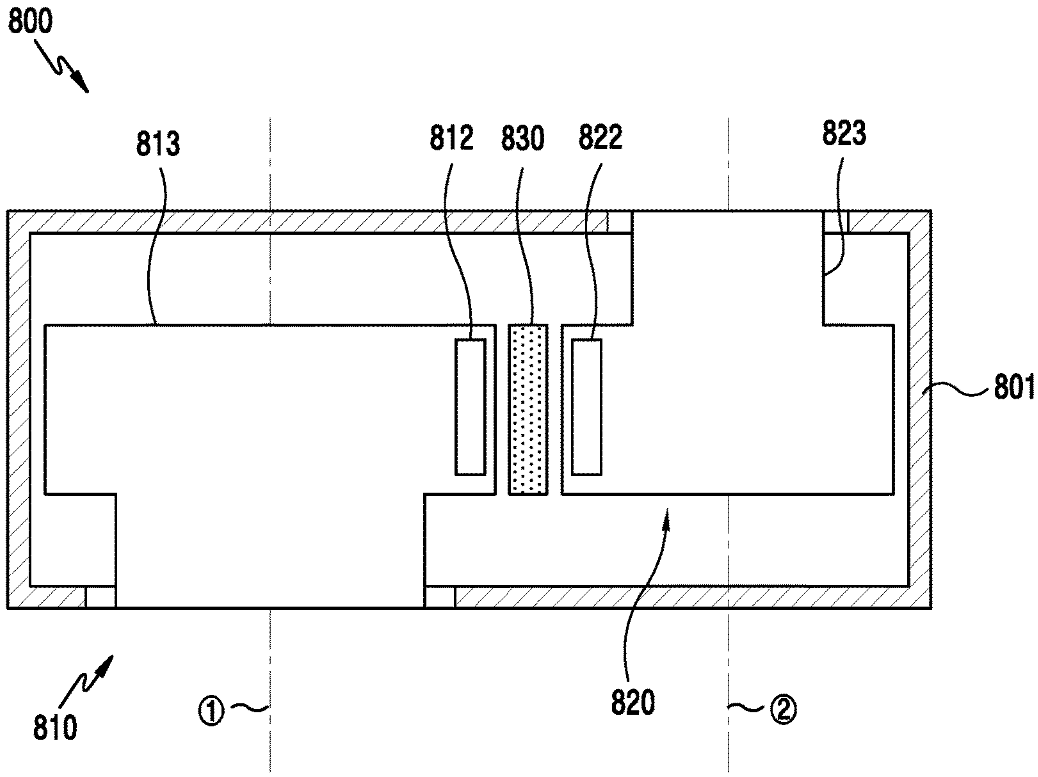
FIGS. 8, 9, 10 and 11 are cross-sectional views each illustrating an example configuration of a dual camera module according to various example embodiments of the present disclosure.

Referring to FIG. 8, in comparison with the dual camera module 700 illustrated in FIG. 7, although in the dual camera module 800 according to various embodiments, the first and second camera modules share one magnet 830, the dual camera module 800 may include first and second lens barrels which have different shapes and structures, and in which the lenses are disposed to face opposite directions, respectively. For example, in comparison with the first lens barrel 810, the second lens barrel 820 may be configured to have a small appearance overall and to have a small moving distance on the optical axis. This is because the lenses, lens groups, or lens systems respectively provided in the first and second lens barrels 810 and 820 have different structures. FIG. 8 also illustrates an example arrangement of the first carrier 813, second carrier 823, first coil unit 812 and second coil unit 822 relative to the single magnet 830 and first and second lens barrels 810, 820, all of which are arranged within the housing 801.

Figure 9:
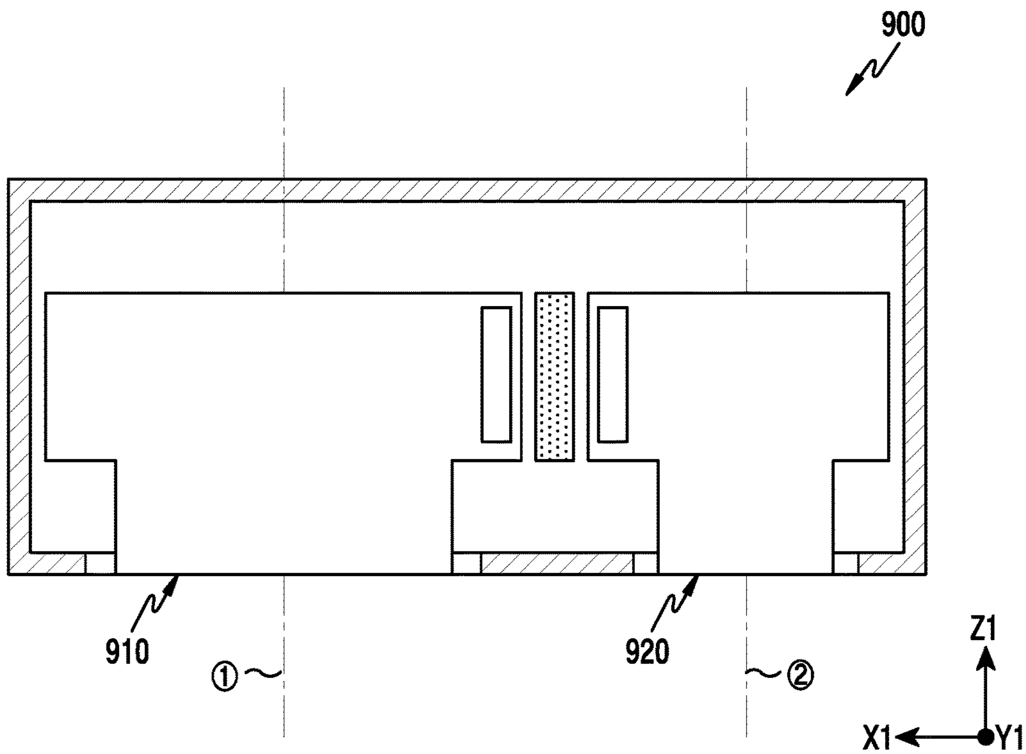

Referring to FIG. 9, in comparison with the dual camera module 800 illustrated in FIG. 8, although, in the dual camera module 900 according to various embodiments the first and second camera modules share a single magnet, the first and second camera modules may be configured in different shapes and structures and may include first and second lens barrels 910 and 920, which are arranged to face the same direction. For example, in comparison with the first lens barrel 910, the second lens barrel 920 may be configured to have a small appearance overall and to have a small moving distance on the optical axis. This is because the lenses, lens groups, or lens systems respectively provided in the first and second lens barrels 910 and 920 have different structures. The same direction as mentioned above may mean that each of the first and second lens barrels 910 and 920 may be disposed to face the front direction of the electronic device. In addition, the same direction as mentioned above may mean that each of the first and second lens barrels 910 and 920 may be disposed to face the rear direction of the electronic device.

Figure 10:
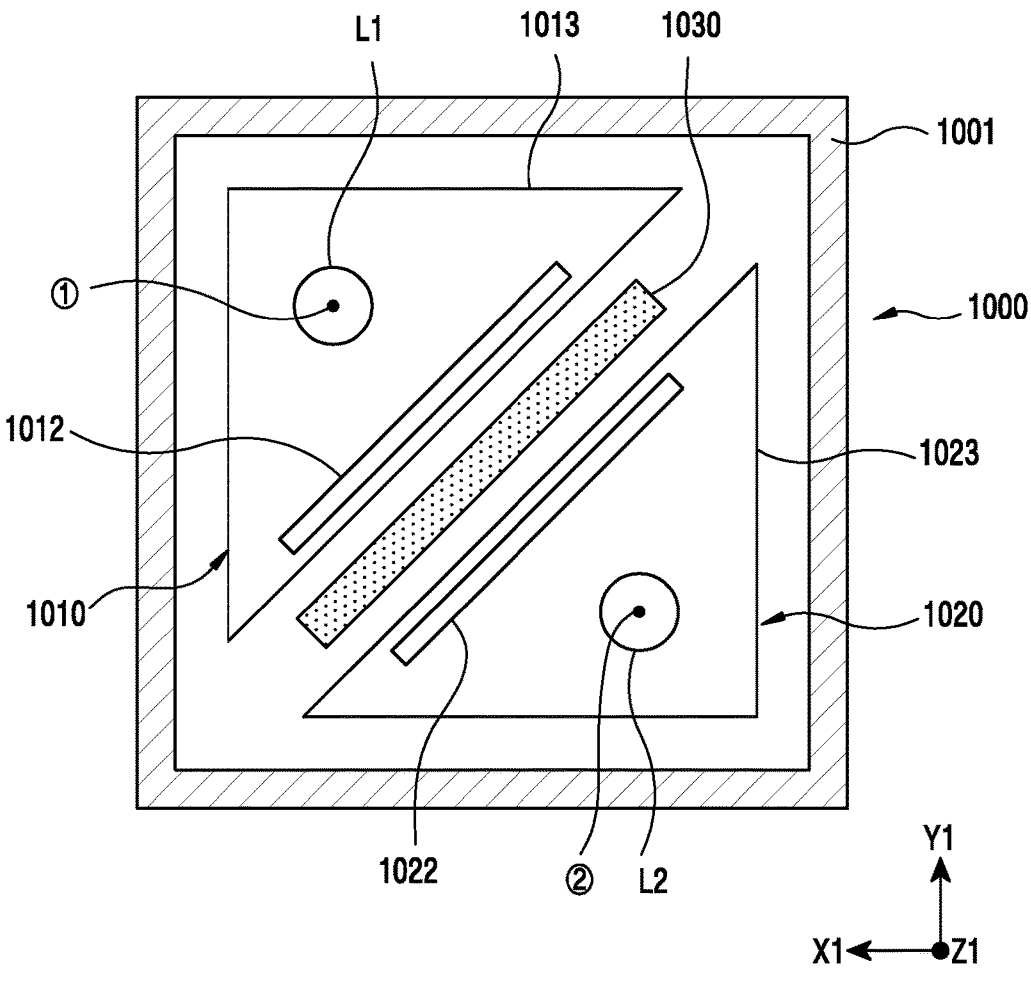

Referring to FIG. 10, in the dual camera module 1000 according to various embodiments, the housing 1001 may have a square column shape while being hollow. For example, the housing 1001 may have a square shape when viewed from above.

When the housing 1001 according to various embodiments is configured in a square column shape, a single magnet 1030, which can be shared by the first and second camera modules 1010 and 1020, may be disposed in a diagonal direction in a state in which the camera modules are erected upright toward the optical axis. When a single magnet 1030 is disposed diagonally within the lens housing 1001, two approximately triangular prismatic spaces may exist. The first camera module 1010 may be disposed in one triangular prismatic space, and the second camera module 1020 may be disposed in another triangular prismatic space. For example, the first camera module 1010 may include a triangular prism-shaped first lens barrel, and the first lens L1 and the first coil unit 1012 may be mounted in the first lens barrel. In addition, the second camera module 1020 may include a triangular prism-shaped second lens barrel, and the second lens L2 and the second coil unit 1022 may be mounted in the second lens barrel. The single magnet 1030 may be fixed to a base (not illustrated). The first camera module 1010 may be moved along the first optical axis ①, and the second camera module 1020 may be moved along the second optical axis ②. The first and second optical axes ① and ② may be parallel to each other. The single magnet 1030 may have one face and another face, the first coil unit 1012 may be disposed to face the one face and the second coil unit 1022 may be disposed to face another face. The first coil unit 1012 and the single magnet 1030 may function as the first driving unit of the first camera module 1010, and the second coil unit 1022 and the single magnet 1030 may operate as the second driving unit of the second camera module 1020.

The first and second camera modules 1010 and 1020 according to various embodiments may have the same structure and may be arranged symmetrically with respect to the single magnet within the housing.

In the dual camera module 1000 according to various embodiments, the first and second lenses L1 and L2 may be disposed to face the same direction or to face opposite directions, respectively.

Figure 11:
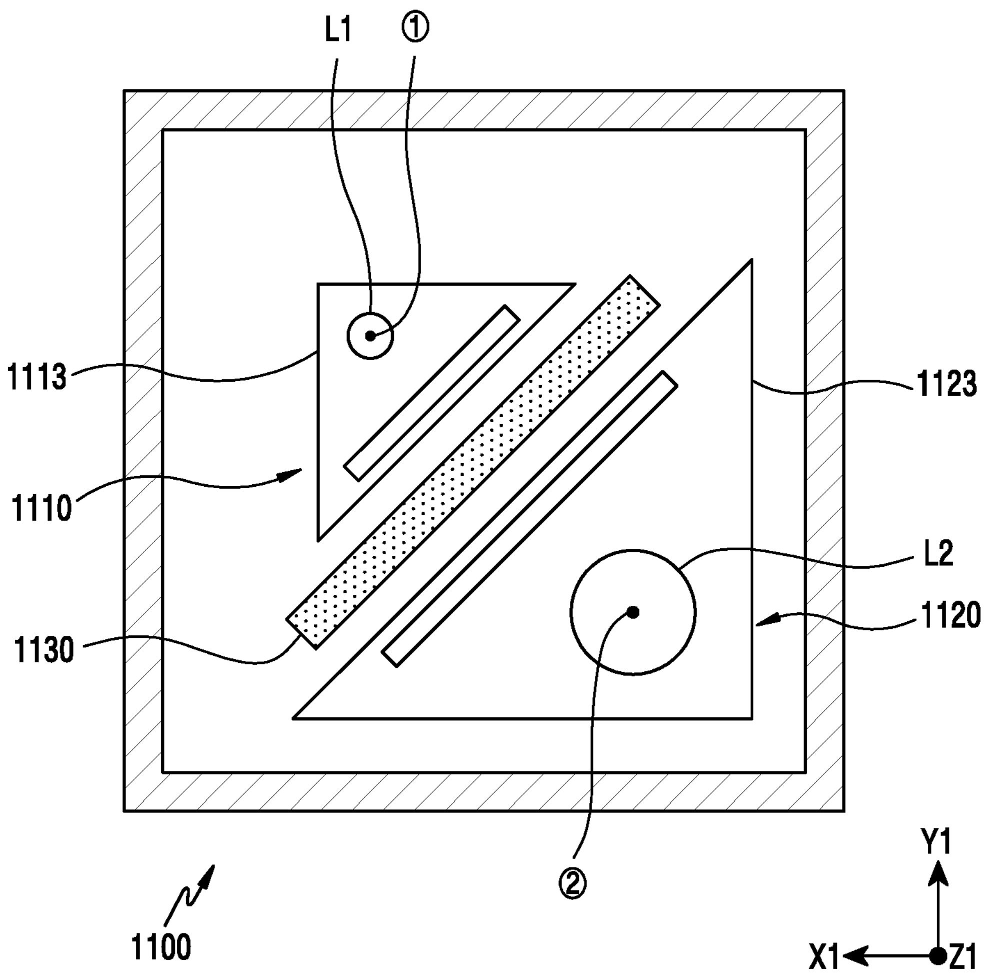

Referring to FIG. 11, in comparison with the dual camera module 1000 illustrated in FIG. 10, although the first and second camera modules 1110 and 1120 share a single magnet 1130, the dual camera module 1100 according to various embodiments may include first and second lens barrels 1113 and 1123 in which the first and second lenses L1 and L2 are disposed to face the same direction or disposed to face opposite directions, respectively. For example, in comparison with the first lens barrel 1113, the second lens barrel 1123 may be configured to have a large appearance overall and to have a large moving distance on the optical axis. This is because the lenses, lens groups, or lens systems respectively provided in the first and second lens barrels 1113 and 1123 have different structures.

Figure 12A:
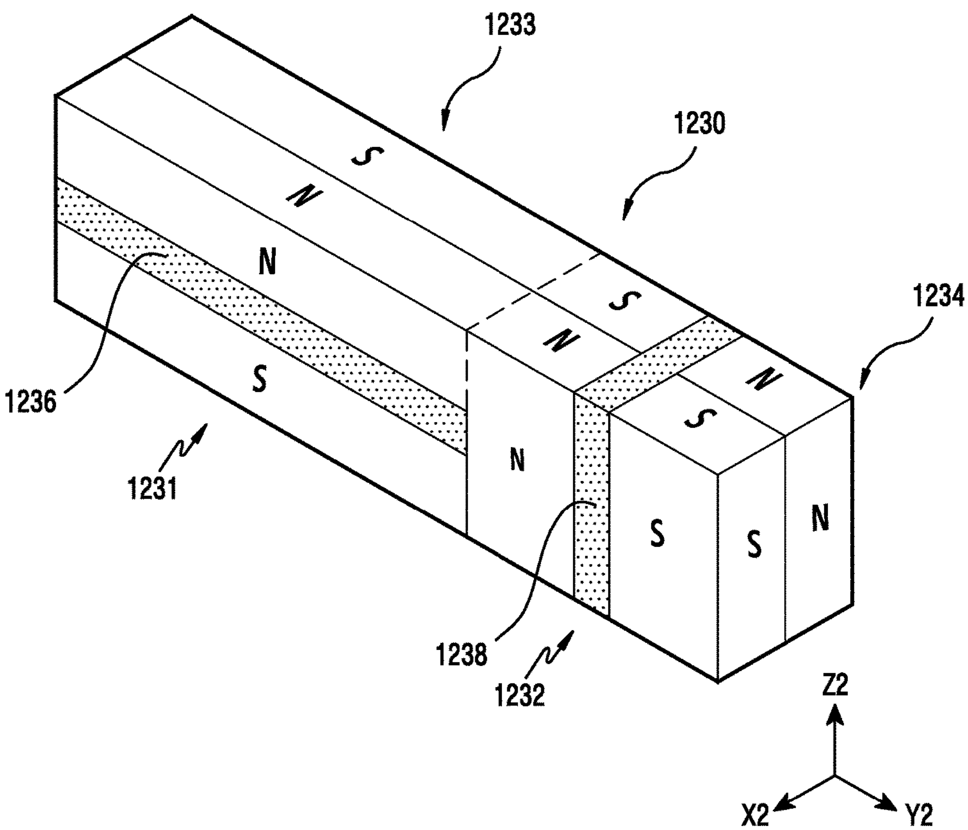
FIG. 12A is a perspective view illustrating an example composite magnet used in a dual camera module according to various example embodiments of the present disclosure.
Figure 12B:
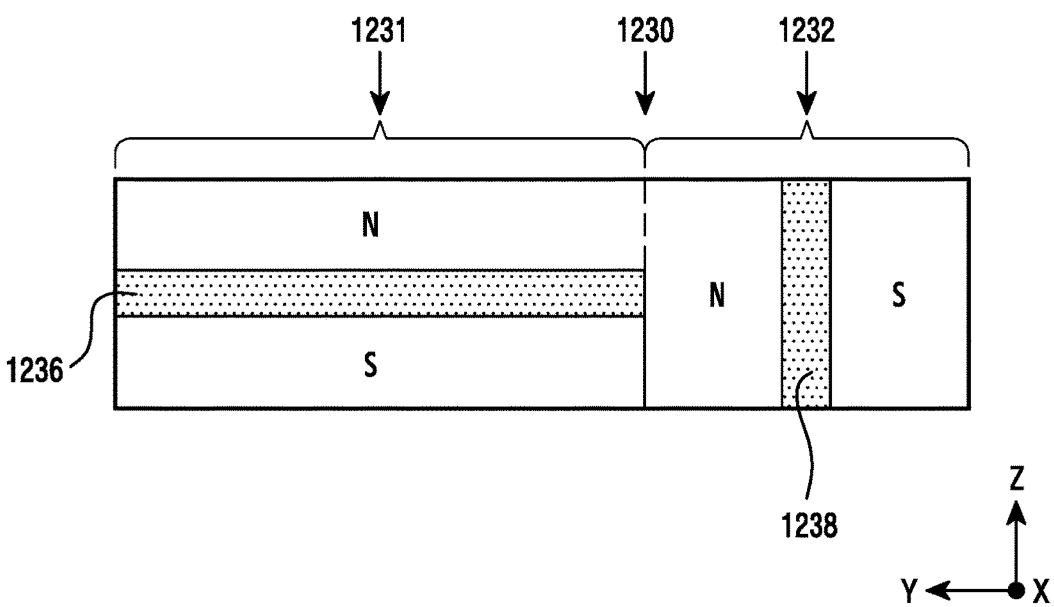
FIG. 12B is a front view of FIG. 12A.

FIG. 12A is a perspective view illustrating an example composite magnet used in a dual camera module according to various example embodiments of the present disclosure. FIG. 12B is a front view of FIG. 12A, and FIG. 12C is a rear view of FIG. 12A.

Figure 12C:
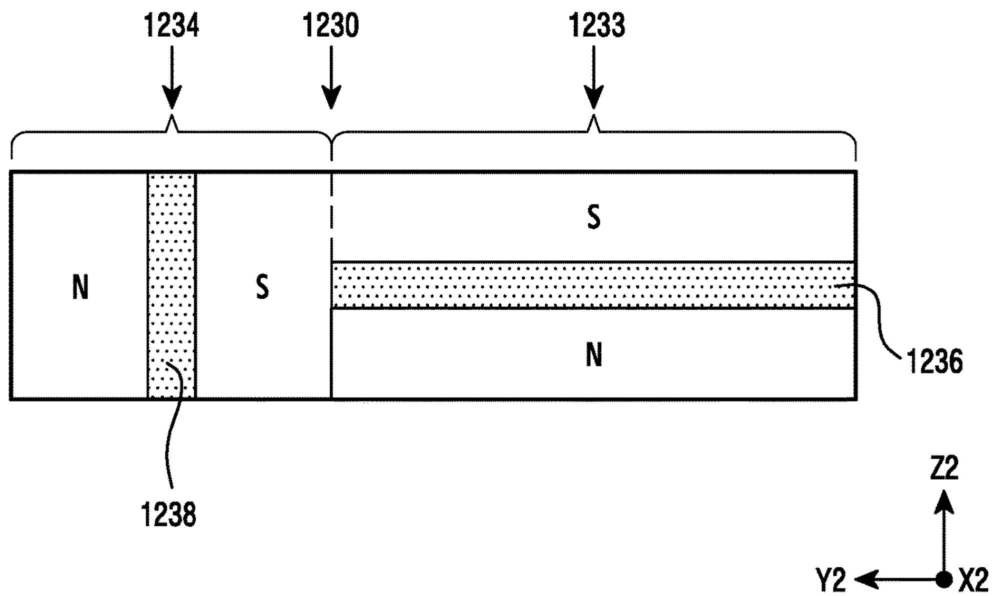
FIG. 12C is a rear view of FIG. 12A.

Referring to FIGS. 12A to 12C, a composite magnet 1230 adopted in the dual camera module according to various embodiments has a plurality of magnetization structures including N and S poles, so that a plurality of driving units can be disposed. In describing the drawings, an orthogonal coordinate system may be used. An X2 axis is a first direction of the composite magnet 1230, aY2 axis is a second direction of the composite magnet 1230, and a Z2 axis is a third direction of the composite magnet 1230. For example, the X2 axis has a forward (X2+) direction and a reverse (X2−) direction, the Y2 axis has a forward (Y2+) direction and a reverse (Y2−) direction, and the Z2 axis has a forward (Z2+) direction and a reverse (Z2−) direction.

The face of the composite magnet 1230 facing the first direction may be referred to as a first face, the face of the composite magnet 1230 facing the second direction may be referred to as a second face, and the face of the composite magnet 1230 facing the third direction may be referred to as the third face.

In describing the composite magnet 1230 according to various embodiments, a structure composed of one N pole and one S pole may, for example, be referred to as a single magnet, a unit magnet, a magnet scrap, or a magnet piece. A void may be or may not be provided between the N pole and the S pole. Each composite magnet 1230 according to various embodiments may include first and second magnets 1231 and 1232 disposed in the first direction and third and fourth magnets 1233 and 1234 disposed in a direction opposite the first direction. The first and second magnets 1231 and 1232 may be disposed on the first face of the composite magnet 1230 and the third and fourth magnets 1233 and 1234 may be disposed on the face opposite the first face.

The first magnet 1231 according to various embodiments may have a structure in which the N pole and the S pole are magnetized on a first void 1236. For example, the N pole and the S pole may be disposed to be spaced apart from and parallel to each other by the first void 1236 in the horizontal direction, and may be arranged to overlap in the vertical direction. The first void 1236 may be disposed to face the horizontal direction.

The second magnet 1232 according to various embodiments may have a structure in which the N pole and the S pole are magnetized on a second void 1238. For example, the N pole and the S pole may be disposed to be spaced apart from and parallel to each other with the second void 1238 interposed therebetween in the vertical direction, and may be arranged to overlap in the horizontal direction.

The N pole of the first magnet 1231 and the N pole of the second magnet 1232 may be integrally formed. For example, the N pole of the first magnet 1231 and the N pole of the second magnet 1232 may be arranged perpendicular to each other, and may form a "ㄱ" shape together. The N pole of the first magnet 1231 and the N pole of the second magnet 1232 may be integrally formed, or may be fabricated independently of each other and magnetized relative to each other.

The third magnet 1233 according to various embodiments may have a structure in which the N pole and the S pole are magnetized on the first void 1236. For example, the N pole and the S pole may be disposed to be spaced apart from and parallel to each other by the first void 1236 in the horizontal direction, and may be arranged to overlap in the vertical direction. The first void 1236 may be disposed to face the horizontal direction.

The fourth magnet 1234 according to various embodiments may have a structure in which the N pole and the S pole are magnetized on the second void 1238. For example, the N pole and the S pole may be disposed to be spaced apart from and parallel to each other with the second void 1238 interposed therebetween in the horizontal direction, and may be arranged to overlap in the horizontal direction. The second void 1238 may be disposed to face the vertical direction.

The S pole of the third magnet 1233 and the S pole of the fourth magnet 1234 may be integrally formed. For example, the S pole of the third magnet 1233 and the S pole of the fourth magnet 1234 may be arranged perpendicular to each other, and may form a "ㄱ" shape together. The S pole of the third magnet 1233 and the S pole of the fourth magnet 1234 may be integrally formed, and may be fabricated independently of each other and magnetized relative to each other.

The first magnet 1231 according to various embodiments may have a structure in which the first magnet 1231 is magnetized with the third magnet 1233 and the second magnet 1232 may be disposed in a structure, which is magnetized with the fourth magnet 1234. In addition, the N pole of the first magnet 1231 and the S pole of the third magnet 1233 may be configured to be magnetized with each other, and the S pole of the first magnet 1231 and the N pole of the third magnet 1233 may be configured to be magnetized with each other. Also, the S pole of the second magnet 1232 and the N pole of the fourth magnet 1234 may be configured to be magnetized with each other.

The composite magnet 1230 according to various embodiments may have six outer faces in a rectangular parallelepiped shape. For example, the composite magnet 1230 may include a front face, a rear face, a left face, a right face, an upper face, and a lower face. At least one magnet may be disposed on each of the faces listed above. That is, each of the above-listed faces may include an arrangement structure of one or more N poles and S poles.

The composite magnet 1230 according to various embodiments may include two (first and second) voids 1236 and 1238, in which each of the first and second voids 1236 and 1238 may be made of a non-magnetic material. The first and second voids 1236 and 1238 may be spaced apart from each other, and may be oriented perpendicular to each other.

Figure 13:
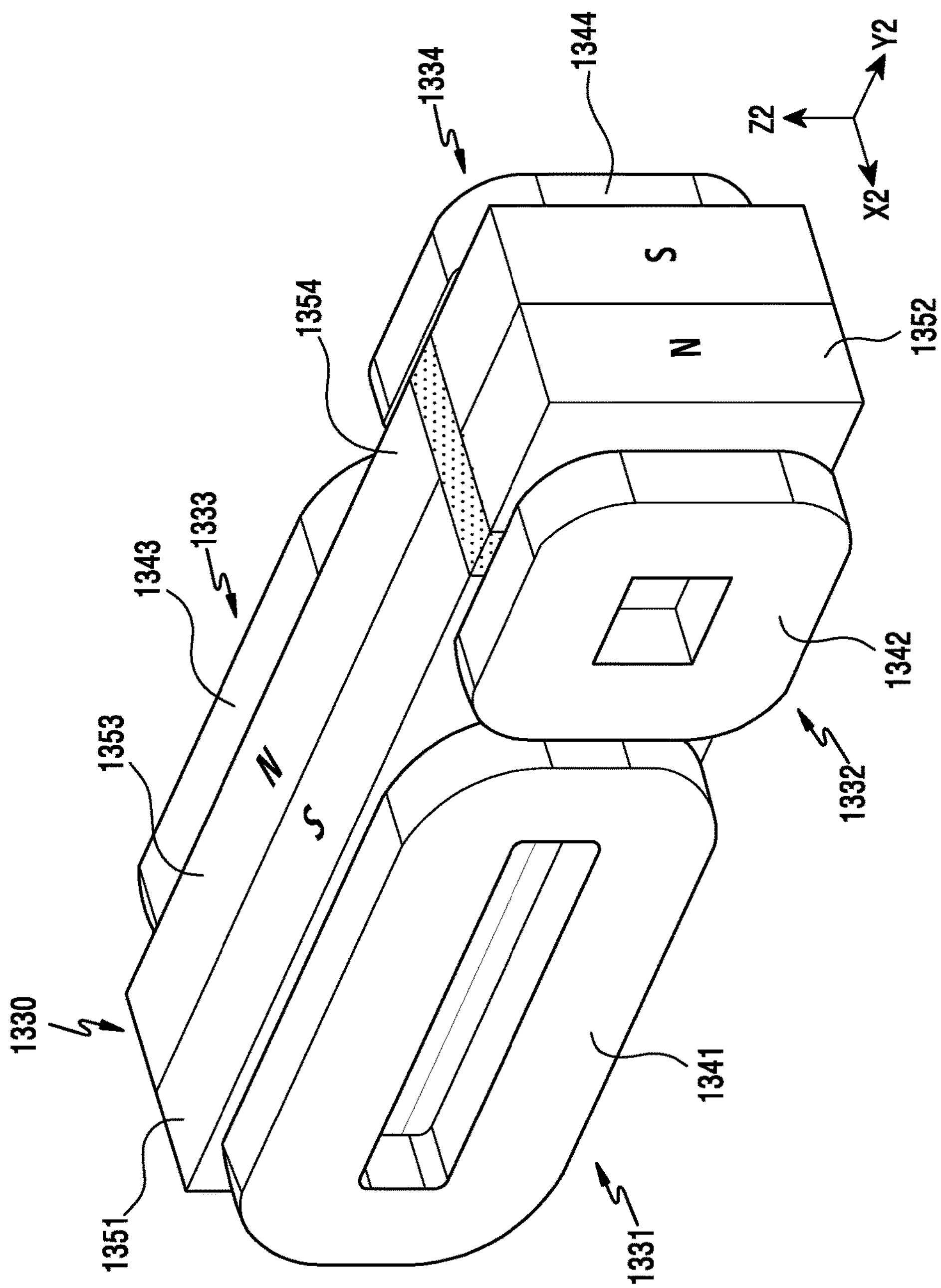
FIG. 13 is a perspective view illustrating an example driving device of a lens barrel adopted in a dual camera module according to various example embodiments of the present disclosure.

FIG. 13 is a perspective view illustrating an example driving device of a lens barrel adopted in a dual camera module according to various example embodiments of the present disclosure.

Referring to FIG. 13, a composite magnet 1330 according to various embodiments may be the same or similar magnet as the composite magnet 1230 illustrated in FIGS. 12A to 12C. In the composite magnet 1330 according to various embodiments, first to fourth coil units 1341 to 1344 may be disposed to respectively face first to fourth magnets 1351 to 1354, thereby configuring first to fourth driving units 1331 to 1334. For example, the first magnet 1351 may be disposed to face the first coil unit 1341 with a gap formed therebetween so as to provide a first electromagnetic force, the second magnet 1352 may be disposed to face the second coil unit 1342 with a gap is interposed therebetween so as to provide a second electromagnetic force, the third driving unit 1353 may be disposed to face the third coil unit 1343 with a gap formed therebetween so as to provide a third electromagnetic force, and the fourth driving unit 1334 may be disposed to face the fourth coil unit 1343 with a gap formed therebetween so as to provide a fourth electromagnetic force.

The arrangement of the driving units in the composite magnet 1330 can provide a driving force for moving two lens barrels in two directions with a single magnet.

Figure 14:
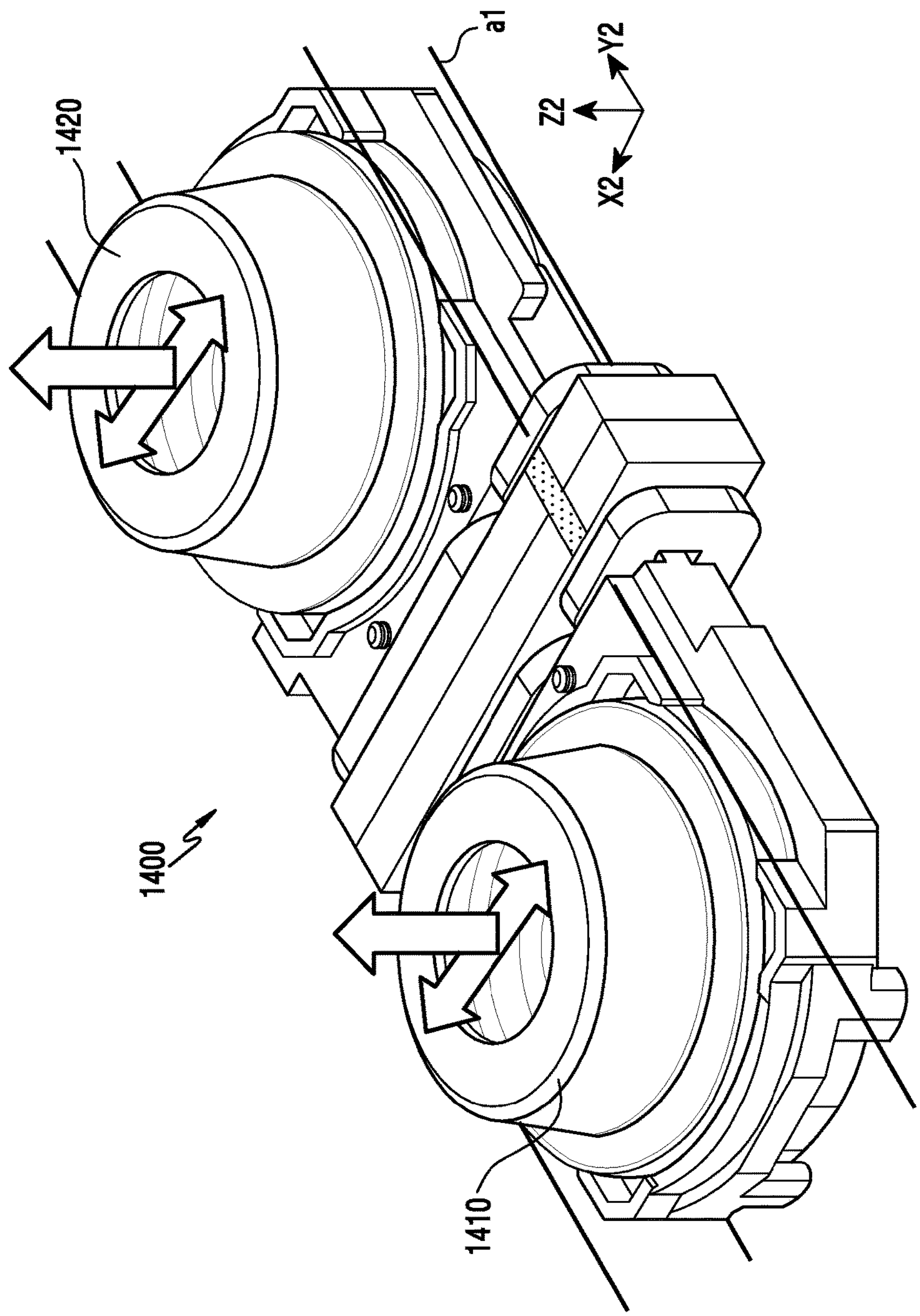
FIG. 14 is a perspective view illustrating an example dual camera module according to various example embodiments of the present disclosure.

FIG. 14 is a perspective view illustrating an example dual camera module according to various example embodiments of the present disclosure.

Referring to FIG. 14, the dual camera module 1400 according to various embodiments may be equipped with the driving device of the lens barrel illustrated in FIG. 13.

In the dual camera module 1400 according to various embodiments, the first lens barrel 1410 is movable in each of the X2 and Z2 directions by each of the first and second electromagnetic forces provided by the first and second driving units, and the second lens barrel 1420 is movable in each of the X2 and Z2 directions by each of the third and fourth electromagnetic forces provided by the third and fourth driving units. White arrows illustrated in the drawing indicate the directions of movement of the first and second lens barrels 1410 and 1420.

Figure 15:
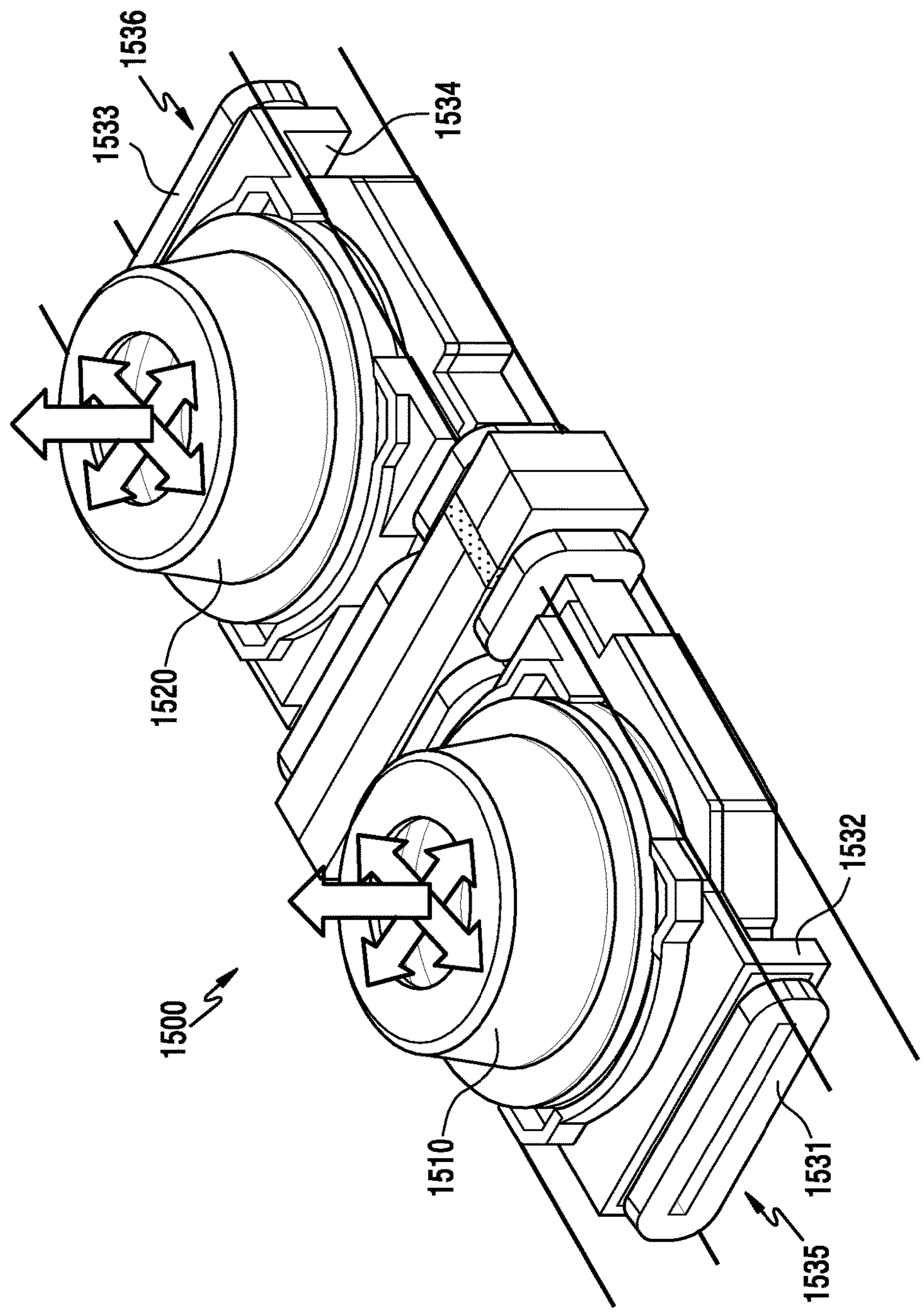
FIG. 15 is a perspective view illustrating another example dual camera module according to various example embodiments of the present disclosure.

FIG. 15 is a perspective view illustrating another example dual camera module according to various example embodiments of the present disclosure.

Referring to FIG. 15, a dual camera module 1500 according to various embodiments may further include a fifth driving unit 1535 and a sixth driving unit 1536 in addition to the dual camera module 1400 illustrated in FIG. 14, so that each of the first and second lens barrels 1510 and 1520 can be moved in three axial directions.

In the dual camera module 1500 according to various embodiments, the fifth driving unit 1535 may be disposed at a position that is opposite the first driving unit, that is, in an outer side region that is opposite the first driving unit with respect to the first lens barrel 1510 interposed therebetween. For example, the fifth driver 1535 may include a fifth coil unit 1531 and a fifth magnet 1532. White arrows illustrated in the drawing indicate the directions of movement of the first lens barrel 1510.

In the dual camera module 1500 according to various embodiments, the sixth driving unit 1536 may be disposed at a position that is opposite the third driving unit, that is, in an outer side region that is opposite the third driving unit with respect to the second lens barrel 1520 interposed therebetween. For example, the sixth driving unit 1536 may include a sixth coil unit 1533 and a sixth magnet 1534. White arrows illustrated in the drawing indicate the directions of movement of the second lens barrel 1520.

In the dual camera module 1500 according to various embodiments, the first lens barrel 1510 is movable in each of the X2, Y2, and Z2 directions by each of the first, second, and fifth electromagnetic forces provided by the first, second, and fifth driving units, and the second lens barrel 1520 is movable in each of the X2, Y2, and Z2 directions by each of the third, fourth, and sixth electromagnetic forces provided by the third, fourth, and sixth driving units.

Figure 16A:
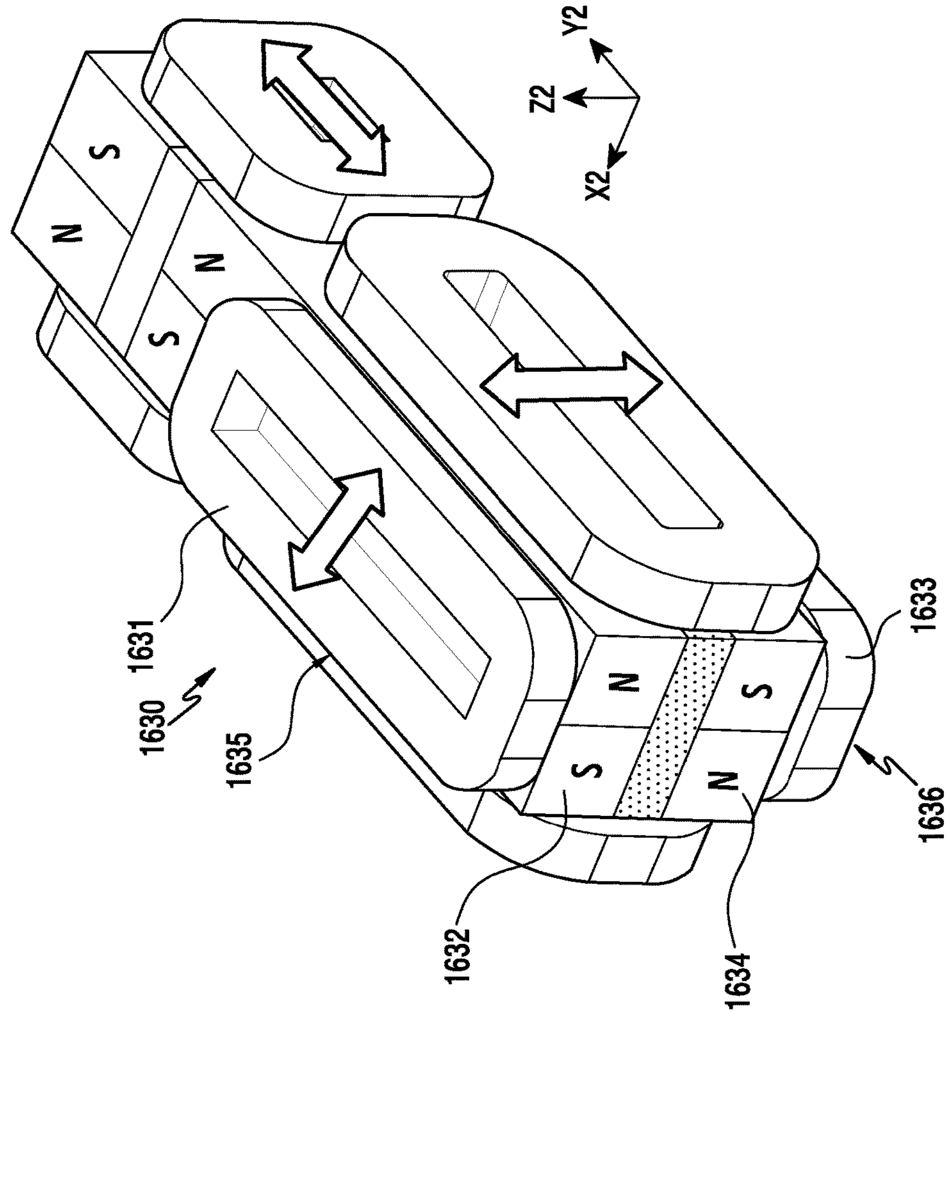
FIG. 16A is a perspective view illustrating an example driving device of a lens barrel adopted in a dual camera module according to various example embodiments of the present disclosure.
Figure 16B:
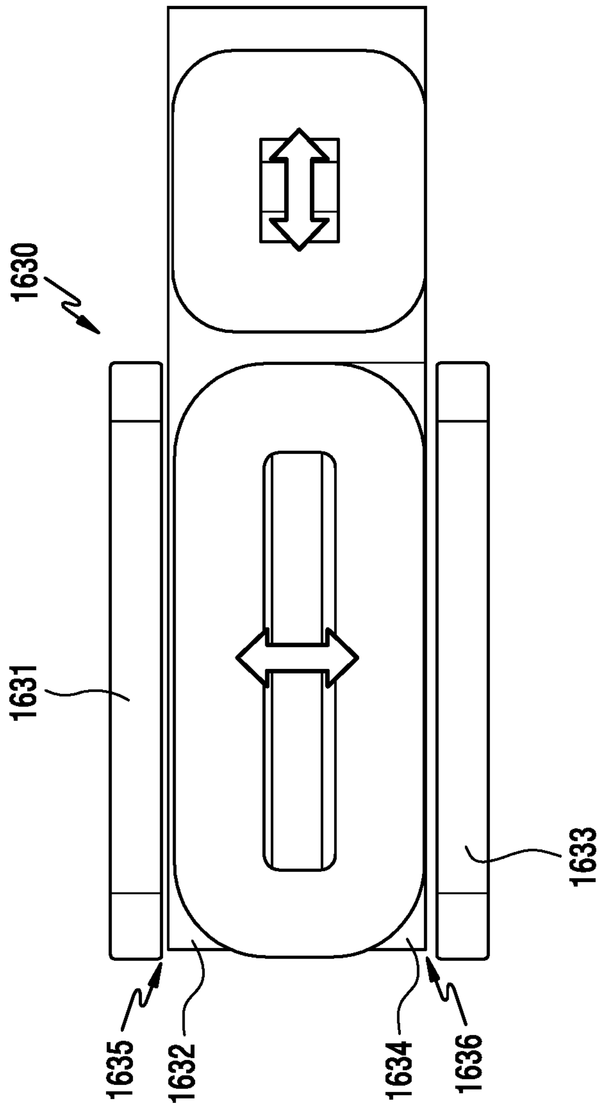
FIG. 16B is a front view of FIG. 16A.
Figure 16C:
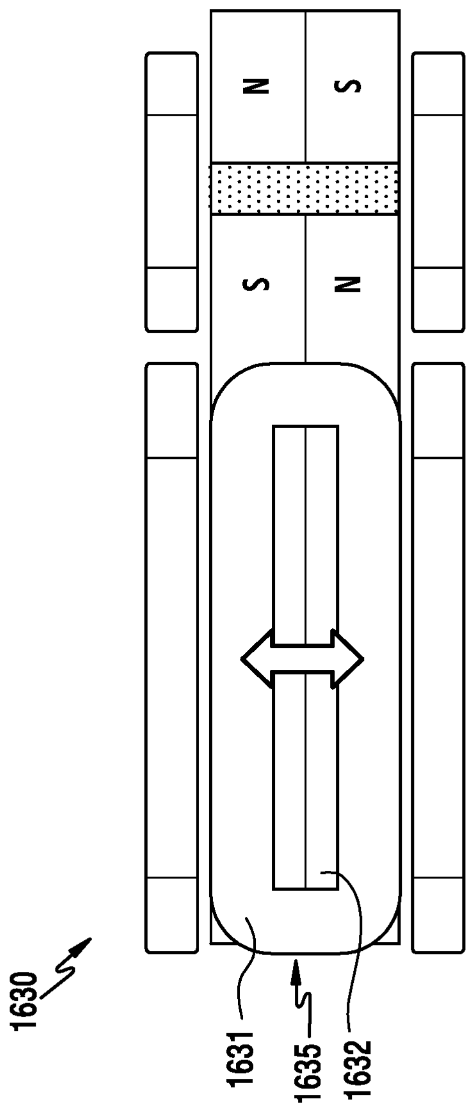
FIG. 16C is a plan view of FIG. 16A.
Figure 16D:
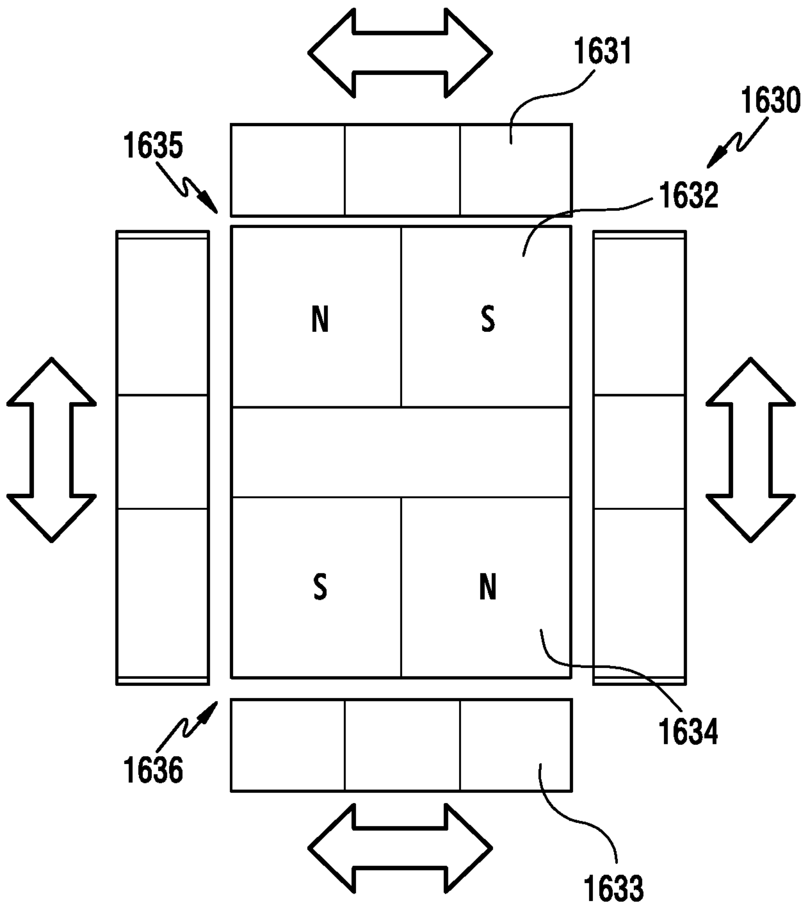
FIG. 16D is a side view of FIG. 16A.

FIG. 16A is a perspective view illustrating an example driving device of a lens barrel adopted in a dual camera module according to various example embodiments of the present disclosure. FIG. 16B is a front view of FIG. 16A, FIG. 16C is a plan view of FIG. 16A, and FIG. 16D is a side view of FIG. 16A.

Referring to FIGS. 16A to 16D, in comparison with the driving device of the dual camera module illustrated in FIG. 13, a driving unit 1630 mounted on a dual camera module according to various embodiments may further include fifth and sixth driving units 1635 and 1636 disposed therein. Therefore, the detailed description of the first to fourth driving units of the driving device of a lens barrel according to various embodiments will not be repeated here.

The driving apparatus for the lens barrel according to various embodiments may include a fifth driving unit 1635 including a fifth magnet 1632 and a fifth coil unit 1631, which are disposed on the upper face of a composite magnet, and a sixth driving unit 1636 including a sixth magnet 1634 and a sixth coil unit 1633, which are disposed on the lower face of the composite magnet.

The fifth driving unit 1635 according to various embodiments can provide a force for moving a lens barrel in the X2 direction by a fifth electromagnetic force provided by the fifth coil 1631 and the fifth magnet 1632. The fifth coil unit 1631 may be disposed to face the fifth magnet 1632 placed on the upper face of the composite magnet with a gap formed therebetween. The sixth driving unit 1636 according to various embodiments can provide a force for moving a lens barrel in the X2 direction by a sixth electromagnetic force provided by the sixth coil 1633 and the sixth magnet 1634. The sixth coil unit 1633 may be disposed to face the sixth magnet 1634 placed on the lower face of the composite magnet with a gap formed therebetween.

According to various embodiments of the present disclosure, each of the first and second lens barrels can be moved in the X2, Y2, and Z2 directions according to the arrangement of the first to sixth driving units.

Hereinafter, an arrangement relationship between lenses and image sensors will be described with reference to the accompanying drawings.

Figure 17A:
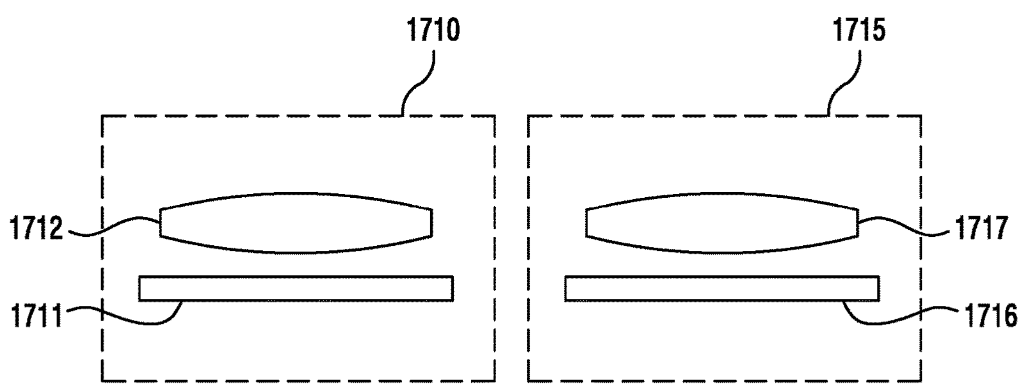
FIGS. 17A, 17B, 18A, 18B, 19A and 19B are diagrams illustrating various example embodiments of an arrangement state between image sensors and lenses, which are respectively disposed in the first and second camera modules of a dual camera module according to various example embodiments of the present disclosure.

Referring to FIG. 17A, a dual camera module according to various example embodiments may include a first camera module 1710 including a first image sensor 1711 and a first lens 1712 disposed on the first image sensor 1711, and a second camera module 1715 including a second image sensor 1716 and a second lens 1717 disposed on the second image sensor 1716. For example, the first lens may include a first lens system or a first lens group, and the second lens may include a second lens system or a second lens group.

For example, each of the first and second lenses 1712 and 1717 is configured with a solid-state lens, so that they can respectively move along first and second optical axes so as to focus on a subject.

Figure 17B:
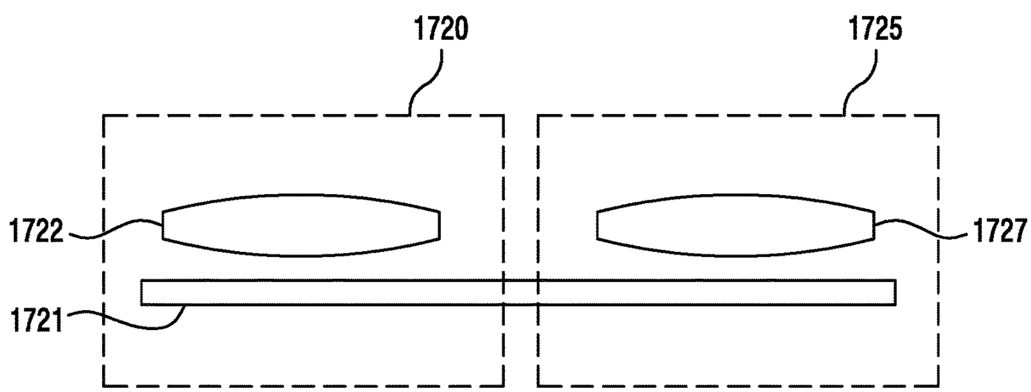

Referring to FIG. 17B, a dual camera module according to various example embodiments may include a first camera module 1720 including an image sensor 1721 and a first lens

1722 disposed on the image sensor 1721, and a second camera module 1725 including the image sensor 1721 and a second lens 1727 disposed on the image sensor 1721 next to the first lens 1722 to be parallel to the first lens 1722. For example, the first lens may include a first lens system or a first lens group, and the second lens may include a second lens system or a second lens group.

For example, each of the first and second lenses 1722 and 1727 is configured with a solid-state lens, so that they can respectively move along first and second optical axes so as to focus on a subject. The image sensor 1721 can be commonly shared. The image sensor 1721 may include a first portion facing the first lens 1722 and a second portion facing the second lens 1727.

Figure 18A:
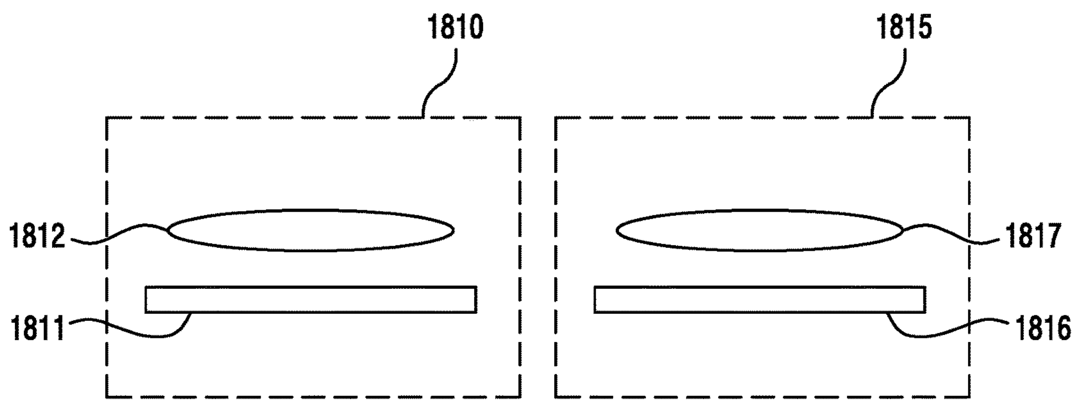

Referring to FIG. 18A, a dual camera module according to various example embodiments may include a first camera module 1810 including a first image sensor 1811 and a first lens 1812 disposed on the first image sensor 1811, and a second camera module 1815 including a second image sensor 1816 and a second lens 1817 disposed on the second image sensor 1816.

For example, each of the first and second lenses 1812 and 1817 is configured with a liquid-state lens, so that the thickness of each of the first and second lenses can be adjusted so as to focus on a subject.

Figure 18B:
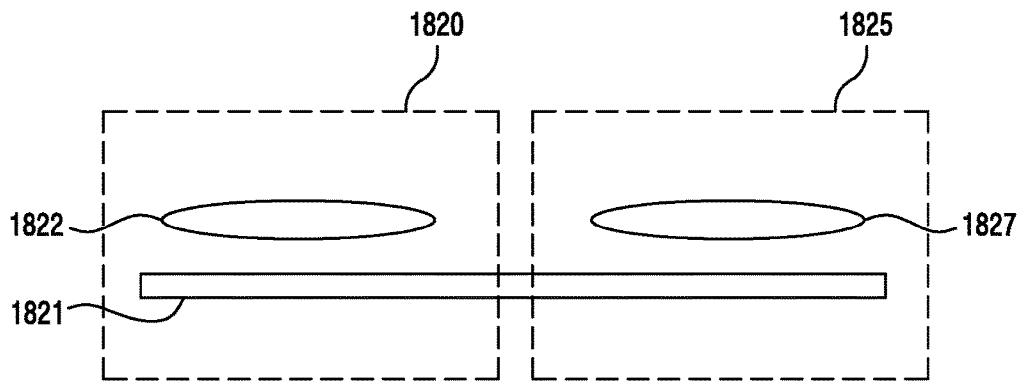

Referring to FIG. 18B, a dual camera module according to various example embodiments may include a first camera module 1820 including an image sensor 1821 and a first lens 1822 disposed on the image sensor 1821, and a second camera module 1825 including the image sensor 1821 and a second lens 1827 disposed on the image sensor 1821. The image sensor 1821 can be commonly shared.

For example, each of the first and second lenses 1822 and 1827 is configured with a liquid-state lens, so that the thickness of each of the first and second lenses can be adjusted so as to focus on a subject.

Figure 19A:
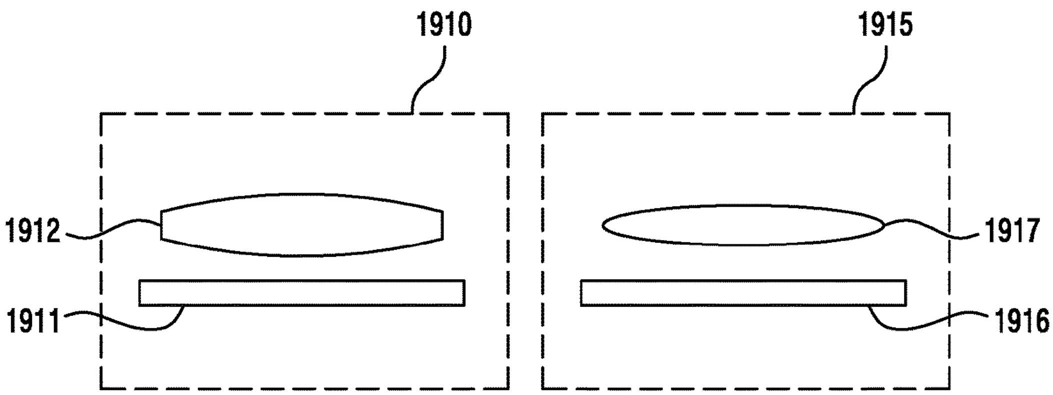

Referring to FIG. 19A, a dual camera module according to various example embodiments may include a first camera module 1910 including a first image sensor 1911 and a first lens 1912 disposed on the first image sensor 1911, and a second camera module 1915 including a second image sensor 1916 and a second lens 1917 disposed on the second image sensor 1916. For example, the first lens may include a first lens system or a first lens group.

For example, the first lens 1912 is able to focus on a subject by moving along the optical axis since the first lens 1912 is configured with a solid-state lens, and the second lens 1917 is able to focus on a subject by adjusting the thickness thereof since the second lens 1917 is configured with a liquid lens.

Figure 19B:
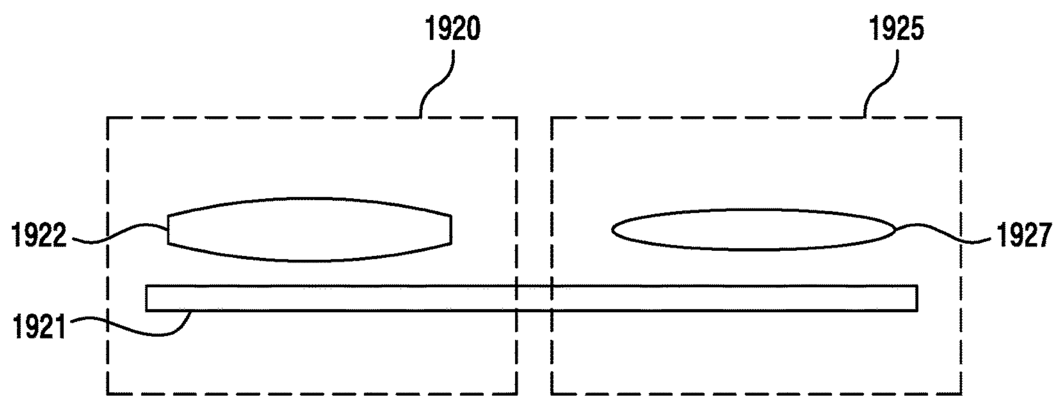

Referring to FIG. 19B, a dual camera module according to various example embodiments may include a first camera module 1920 including an image sensor 1921 and a first lens 1922 disposed on the image sensor 1921, and a second camera module 1925 including the image sensor 1921 and a second lens 1927 disposed on the image sensor 1921. The image sensor 1921 can be commonly shared.

For example, the first lens 1922 is able to focus on a subject by moving along the optical axis since the first lens 1922 is configured with a solid-state lens, and the second lens 1927 is able to focus on a subject by adjusting the thickness thereof since the second lens 1927 is configured with a liquid lens.

Figure 20:
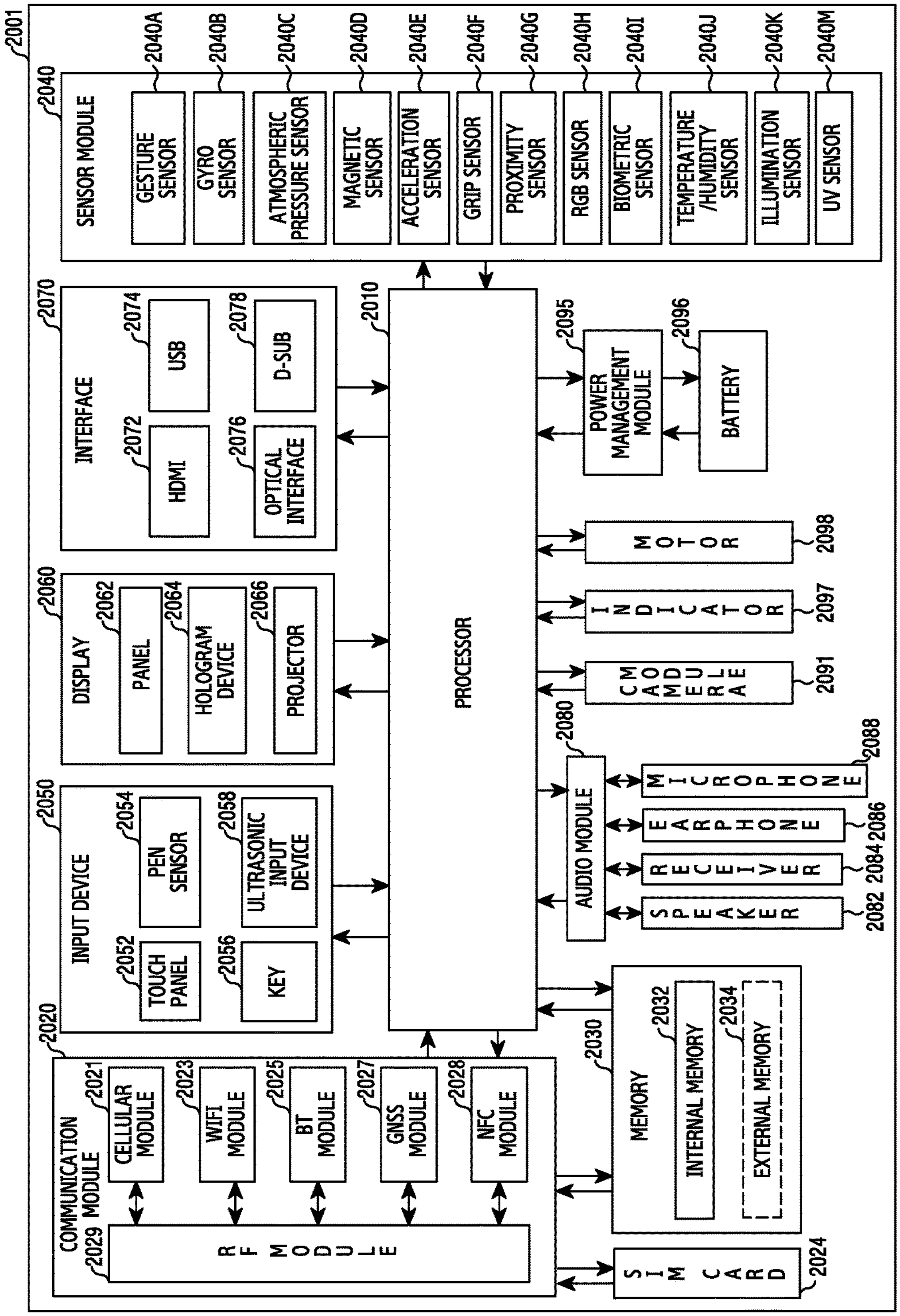
FIG. 20 is a block diagram illustrating an example electronic device 2001 according to various example embodiments of the present disclosure.

FIG. 20 is a block diagram illustrating an example electronic device 2001 according to various example embodiments of the present disclosure.

The electronic device 2001 may include one or more processors (e.g., an application processor (AP)) 2010, a communication module 2020, a subscriber identification module 2024, a memory 2030, a sensor module 2040, an input device 2050, a display 2060, an interface 2070, an audio module 2080, a camera module 2091, a power management module 2095, a battery 2096, an indicator 2097, and a motor 2098.

In various embodiments, the electronic device 2001 does not necessarily include the components of FIG. 20, and can include more or less components than those in FIG. 20. For example, the electronic device 2001 according to various embodiments may not include some components according to its type. According to various embodiments, the components of the electronic device 2001 can be received in its housing (or a bezel, a main body) or mounted outside the electronic device 2001.

The processor 2010 may, for example, include various processing circuitry and operate an operating system or an application program, to control a majority of hardware or software elements connected to the processor 2010, and may perform various data processing and operations. The processor 2010 may be, for example, implemented as a system on chip (SoC). According to an exemplary embodiment, the processor 2010 may further include a graphic processing unit (GPU) and/or an image signal processor (ISP). The processor 2010 may include at least some (e.g., cellular module 2021) of the elements shown in FIG. 20 as well. The processor 2010 may load a command or data received from at least one of the other elements (e.g., non-volatile memory) to a volatile memory and process the loaded command or data, and may store the result data in the non-volatile memory.

In various embodiments, the processor 2010 can control operations of the electronic device 2001. The processor 2010 can include one or more processors. For example, the processor 2010 can include, for example, and without limitation, a CP, an AP, or the like, an interface (e.g., General Purpose Input/Output (GPIO)), or an internal memory, as separate components or can integrate them on one or more integrated circuits. According to an embodiment, the AP can perform various functions for the electronic device 2001 by executing various software programs, and the CP can process and control voice communications and data communications. The processor 2010 can execute a particular software module (an instruction set) stored in the memory 2030 and thus carry out various functions corresponding to the module.

In various embodiments, the processor 2010 can control hardware modules such as the audio module 2080, the interface 2070, the display 2060, the camera module 2091, the communication module 2020, and the power management module 2095. The processor 2010 can be electrically connected with the power management module 2095, the display 2060, and the memory 2030 of the electronic device 2001.

According to various embodiments, the processor 2010 can process operations for detecting an abnormal battery state (e.g., leakage, failure, etc.). The processor 2010 can control to charge the battery having a preset capacity (e.g., a full capacity) up to the preset capacity using a charger circuit, to monitor the battery using a measuring circuit at preset capacities, to obtain first information and second information about the battery at different times based on monitoring results, to determine a battery state based on a difference of the first information and the second information, and to output notification information of the battery based on a determination result.

The processing (or controlling) operations of the processor 2010 according to various embodiments shall be elucidated by referring to the drawings.

The communication module 2020 may, for example, include various communication circuitry, such as, for example, and without limitation, a cellular module 2021, a WiFi module 2023, a Bluetooth module 2025, a GNSS module 2027, an NFC module 2028, and an RF module 2029, or the like. For example, the communication module 2020 may further include a WiGig module (not shown). According to one embodiment, the WiFi module 2023 and the WiGig module (not shown) may be integrated into one chip.

The cellular module 2021 may, for example, provide voice telephony, video telephony, a text service, an Internet service or the like through a telecommunication network. According to an exemplary embodiment, the cellular module 2021 may perform the distinction and authentication of the electronic device 2001 within the telecommunication network by using the subscriber identification module (e.g., SIM card) 2024. According to an example embodiment, the cellular module 2021 may perform at least some functions among functions the processor 2010 may provide. According to an exemplary embodiment, the cellular module 2021 may include a communication processor (CP).

According to some example embodiments, at least some (e.g., two or more) of the cellular module 2021, the WiFi module 2023, the Bluetooth module 2025, the GNSS module 2027 or the NFC module 2028 may be included within one integrated chip (IC) or IC package.

The RF module 2029 may, for example, transmit and/or receive a communication signal (e.g., an RF signal). The RF module 2029 may, for example, include a transceiver, a power amplifier module (PAM), a frequency filter, a low noise amplifier (LNA), an antenna or the like. According to another exemplary embodiment, at least one of the cellular module 2021, the WiFi module 2023, the Bluetooth module 2025, the GNSS module 2027 or the NFC module 2028 may transmit and/or receive an RF signal through a separate RF module.

The WiFi module 2023 may, for example, represent a module for forming a wireless LAN link with a wireless internet connection and an external device. The WiFi module 2023 may be embedded or enclosed in the electronic device 2001. For example, WiFi, WiGig, WiBro, world interoperability for microwave access (WiMax), high speed downlink packet access (HSDPA), or mmWave (millimeter wave) may be used as the wireless internet technology. The WiFi module 2023 may be connected to an external device that is directly connected to the electronic device or via a network (e.g., a wireless Internet network), It is possible to transmit various data of the electronic device 2001 to the outside or receive it from the outside. The WiFi module 2023 may be kept turned on or turned on/off according to the setting of the electronic device or the user input.

The Bluetooth module 2025 and the NFC module 2028 may, for example, represent a short range communication module for performing a short range communication. For example, Bluetooth, low power Bluetooth (BLE), radio frequency identification (RFID), infrared communication (IrDA), ultra wideband (UWB), Zigbee, or NFC may be used as the local communication technology. The short-range communication module interworks with an external device connected to the electronic device 2001 via a network (e.g., a local area communication network) and may be transmitted to or received from the device. The short range communication module (e.g., Bluetooth module 2025 and NFC module 2028) may be kept on at all times or turned on / off according to the setting of the electronic device 2001 or user input.

The subscriber identification module 2024 may, for example, include a card including a subscriber identification module and/or an embedded SIM. And, the subscriber identification module 2024 may include unique identification information (e.g., integrated circuit card identifier (ICCID)) or subscriber information (e.g., international mobile subscriber identity (IMSI)).

The memory 2030 may, for example, include an internal memory 2032 and/or an external memory 2034. The internal memory 2032 may, for example, include at least one of a volatile memory (e.g., a dynamic random access memory (DRAM), a static RAM (SRAM), a synchronous dynamic RAM (SDRAM) or the like), and/or a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive, or a solid state drive (SSD)). The external memory 2034 may include a flash drive, for example, a compact flash (CF), a secure digital (SD), a micro-SD, a mini-SD, an extreme digital (xD), a multi media card (MMC), a memory stick or the like. The external memory 2034 may be operatively or physically coupled with the electronic device 2001 through various interfaces.

In various embodiments, the memory 2030 can store one or more programs, data, or instructions allowing the processor 2010 to charge the battery having a preset capacity (e.g., a full capacity) up to the preset capacity using a charger circuit, to monitor the battery using a measuring circuit at preset capacities, to obtain first information and second information of the battery at different times based on monitoring results, to determine a battery state based on a difference of the first information and the second information, and to output notification information of the battery based on a determination result.

The memory 2030 can include an extended memory (e.g., an external memory 2034) or an internal memory (e.g., an internal memory 2032). The electronic device 2001 may operate in association with a web storage which performs as a storage function of the memory 2030 on the Internet.

The memory 2030 can store one or more software programs (or software modules). For example, software components can include an OS software module, a communication software module, a graphic software module, a UI software module, an MPEG module, a camera software module, and one or more application software modules (e.g., a battery management module, a battery leakage detection module, etc.). The module which is the software component can be represented as a set of instructions and accordingly can be referred to as an instruction set. The module may be referred to as a program. The memory 2030 can include additional modules (instructions) in addition to the above-mentioned modules. Alternatively, if necessary, the memory 2030 may not use some of the modules (instructions).

The OS software module can include various software components for controlling general system operations. Such general system operation control can include, for example, memory management and control, and power control and management. The OS software module can also process normal communication between various hardware (devices) and software components (modules).

The communication software module can enable communication with another electronic device, such as a wearable device, a smart phone, a computer, a server, or a portable terminal, through the communication module 2020 or the interface 2070. Also the communication software module can be configured in a protocol structure corresponding to its communication method.

The graphic software module can include various software components for providing and displaying graphics on the display 2060. The term 'graphics' can encompass texts, web pages, icons, digital images, videos, and animations.

The UI software module can include various software components relating to the UI. For example, the UI software module is involved in a status change of the UI and a condition for the UI status change.

The MPEG module can include a software component enabling digital content (e.g., video, audio), processes, and functions (e.g., contents creation, reproduction, distribution, transmission, etc.).

The camera software module can include camera related software components allowing camera related processes and functions.

The application module can include a web browser including a rendering engine, an e-mail application, an instant message application, a word processing application, a keyboard emulation application, an address book application, a touch list, a widget application, a Digital Right Management (DRM) application, an iris scan application, a context cognition application, a voice recognition application, and a location based service. The application module can include an application module for detecting current leakage inside the battery based on at least part of battery voltage or current, and outputting notification information to the user.

The sensor module 2040 may, for example, measure a physical quantity or sense an activation state of the electronic device 2001, to convert measured or sensed information into an electrical signal. The sensor module 2040 may, for example, include at least one of a gesture sensor 2040A, a gyro sensor 2040B, a barometer (e.g., atmospheric pressure sensor) 2040C, a magnetic sensor 2040D, an acceleration sensor 2040E, a grip sensor 2040F, a proximity sensor 2040G, a color sensor 2040H (e.g., a red, green, blue (RGB) sensor), a biometric sensor 2040I, a temperature-humidity sensor 2040J, an illumination sensor 2040K, or an ultra violet (UV) sensor 2040M. Additionally or alternatively, the sensor module 2040 may, for example, include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 2040 may further include a control circuitry for controlling at least one or more sensors belonging therein. In some exemplary embodiment, the electronic device 2001 may further include a processor configured to control the sensor module 2040 as a part of the processor 2010 or separately, to control the sensor module 2040 while the processor 2010 is in a sleep state.

The input device 2050 may include various input circuitry, such as, for example, and without limitation, include a touch panel 2052, a (digital) pen sensor 2054, a key 2056, or an ultrasonic input device 2058, or the like. The touch panel 2052 may, for example, use at least one scheme among a capacitive overlay scheme, a pressure sensitive scheme, an infrared beam scheme, or an ultrasonic scheme. Also, the touch panel 2052 may further include a control circuitry as well. The touch panel 2052 may further include a tactile layer, to provide a tactile response (i.e., a touch coordinate) to a user.

The (digital) pen sensor 2054 may, for example, be a part of the touch panel 2052, or include a separate sheet for recognition. The key 2056 may, for example, include a physical button, an optical key, or a keypad. The ultrasonic input device 2058 may detect an ultrasonic wave generated in an input tool through a microphone (e.g., a microphone 2088), to identify data corresponding to the detected ultrasonic wave. According to various embodiments, the input device 2050 can include a digital pen. According to various embodiments, the input device 2050 can receive a force touch.

The display 2060 may include a panel 2062, a hologram device 2064, a projector 2066, and/or a control circuitry for controlling them.

The panel 2062 may, for example, be implemented to be flexible, transparent, or wearable. The panel 2062 may be configured as one or more modules along with the touch panel 2052. According to an exemplary embodiment, the panel 2062 may include a pressure sensor (or force sensor) capable of measuring pressure information (e.g., a pressure coordinate and a pressure intensity) on a user's touch. The pressure sensor may be implemented integrally with the touch panel 2052, or be implemented as one or more sensors separate from the touch panel 2052.

The panel 2062 can be received in the display 2060 and detect a user input which contacts or approaches a surface of the display 2060. The user input can include a touch input or a proximity input based on at least one of single-touch, multi-touch, hovering, and air gesture. The panel 2062 can receive a user input which initiates an operation for using the electronic device 2001, and generate an input signal according to the user input. The panel 2062 can convert a change such as pressure applied to a particular point of the display 2060 or capacitance generating at a particular portion of the display 2060, to an electrical input signal. The panel 2062 can detect a location or an area of an input means (e.g., a user finger, a digital pen, etc.) which touches or approaches the surface of the display 2060. The panel 2062 can also detect the pressure (e.g., force touch) of the touch according to the adopted touch method.

The hologram device 2064 may show a three-dimensional image to the air by using the interference of light. The projector 2066 may project light onto a screen to display an image. The screen may, for example, be disposed inside or outside the electronic device 2001.

The interface 2070 may include various interface circuitry, such as, for example, and without limitation, an HDMI 2072, a USB 2074, an optical interface 2076, or a D-subminiature (D-sub) 2078, or the like. The interface 2070 may, for example, include a mobile high-definition link (MHL) interface, an SD card/multi-media card (MMC) interface, or an infrared data association (IrDA) standard interface.

The interface 2070 can receive data from another electronic device, or receive and forward power to the components of the electronic device 2001. The interface 2070 can send data of the electronic device 2001 to the another electronic device. For example, the interface 2070 can include a wired/wireless headset port, an external charger port, a wired/wireless data port, a memory card port, an audio input/output port, a video input/output port, and an earphone port.

The audio module 2080 may, for example, convert a sound and an electrical signal interactively. The audio module 2080 may, for example, process sound information that is inputted or outputted through a speaker 2082, a receiver 2084, an earphone 2086, the microphone 2088 or the like. The audio module 2080 may transmit the audio signal input from the processor 2010 to an output device (e.g., a speaker 2082, a receiver 2084, or an earphone 2086). The audio module 2080 may transmit an audio signal, such as a voice, received from the input device (ex. the microphone 2088) to the processor 2010. The audio module 2080 may convert audio/sound data into audible sound, may output the converted audible sound through the output device under the control of the processor 2010. The audio module 2080 may convert the audio signal, such as voice, received from the input device into a digital signal, and may transmit the converted digital signal to processor 2010.

The speaker 2082 or the receiver 2084 may receive audio data from the communication module 2020 or stored in the memory 2030. The speaker 2082 or the receiver 2084 may output an acoustic signal related to various operations (functions) performed in the electronic device 2001. The microphone 1588 may receive an external acoustic signal and convert to an electrical voice data. The microphone 2088 may be implemented with various noise reduction algorithms for eliminating noise generated in receiving an external sound signal. The microphone 2088 may be responsible for input of audio streaming such as voice commands or the like.

The camera module 2091 may be, for example, a device able to capture a still image and a video. According to an exemplary embodiment, the camera module 2091 may include one or more image sensors (e.g., a front sensor or rear sensor), a lens, an image signal processor (ISP), or a flash (e.g., an LED, a xenon lamp or the like).

According to various embodiments, the camera module 2091 supports a camera function of the electronic device 2001. Under control of the processor 2010, the camera module 2091 can capture a subject and send the captured data (e.g., an image) to the display 2060 and the processor 2010. The camera module 2091 can include, for example, a first camera (e.g., a color (RGB) camera) for obtaining color information and a second camera (e.g., an IR camera) for obtaining depth information (e.g., location information, distance information of a subject). According to an embodiment, the first camera can be a front camera on a front side of the electronic device 2001. The front camera can be replaced by the second camera, and may not be disposed in the front side of the electronic device 2001. The first camera can be disposed on the front side of the electronic device 2001 together with the second camera. According to an embodiment, the first camera can be a rear camera on a rear side of the electronic device 2001. The first camera can include both of the front camera and the second camera on the front side and the rear side respectively of the electronic device 2001.

The camera module 2091 can include an image sensor. The image sensor can be implemented using a Charged Coupled Device (CCD) or a Complementary Metal-Oxide Semiconductor (CMOS), or the like, without limitation.

The power management module 2095 may, for example, manage power of the electronic device 2001. According to an exemplary embodiment, the power management module 2095 may include a power management integrated circuit (PMIC), a charger IC, or a battery or fuel gauge. The PMIC may employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuitry for wireless charging, for example, a coil loop, a resonance circuitry, a rectifier or the like. The battery gauge may, for example, measure a level of the battery 2096, a voltage in charge, an electric current or a temperature. The battery 2096 may, for example, include a rechargeable battery and/or a solar battery.

The indicator 2097 may display a specific state (for example, a booting state, a message state, a charging state or the like) of the electronic device 2001 or a part (e.g., the processor 2010) of the electronic device 2001. The motor 2098 may convert an electrical signal into a mechanical vibration, and may generate a vibration, a haptic effect or the like. The electronic device 2001 may, for example, include a mobile TV support device (e.g., a GPU) capable of processing media data according to the standards of digital multimedia broadcasting (DMB), digital video broadcasting (DVB), mediaFlo™ or the like.

The elements described in the present document disclosure may each include one or more components, and a name of the corresponding element may vary according to the kind of the electronic device. In various example embodiments, the electronic device (e.g., the electronic device 2001) may omit some elements, or further include additional elements, or combine some of the elements and configure the same as one entity to identically perform functions of the corresponding elements before combination.

The above embodiments of the present disclosure may also be implemented as a computer program executed in a computer and may be implemented in a general digital computer which executes the program using a non-transitory computer-readable medium. A data structure used in the above embodiments may be recorded on the computer-readable medium via various means. The computer-readable medium includes storage media such as magnetic storage media (e.g., a read only memory (ROM), floppy disks, hard disks, etc.) and optical recording media (e.g., a compact disc (CD)-ROM, a digital versatile disc (DVD), etc.).

While the present disclosure has been illustrated and described with reference to various example embodiments thereof, it will be understood by those of ordinary skill in the art that various changes in form and details may be made therein without departing from the spirit and scope of the disclosure as defined by the appended claims and their equivalents. The example embodiments should be considered in a descriptive sense only and not for purposes of limitation. Therefore, the scope of the disclosure is defined not by the detailed description of the disclosure but by the appended claims and their equivalents, and all differences within the scope will be understood as being included in the present disclosure.

What is claimed is:

1. A camera module comprising:

a housing;

at least one image sensor disposed in the housing;

a first lens barrel including at least one first lens and disposed in a first portion of the housing facing a first portion of the at least one image sensor;

a second lens barrel including at least one second lens and disposed in a second portion of the housing facing a second portion of the at least one image sensor;

a first coil unit comprising a first coil disposed between the first lens barrel and the second lens barrel adjacent to the first lens barrel, and configured to adjust the first lens barrel;

a second coil unit comprising a second coil disposed between the first lens barrel and the second lens barrel adjacent to the second lens barrel and configured to adjust the second lens barrel;

a magnet disposed between the first coil unit and the second coil unit and configured to provide magnetic force to each of the first and second coils; and a control unit comprising processing circuitry configured to control application of current to the first coil unit and/or the second coil unit, the control unit comprising processing circuitry configured to determine, based on current applied to the first coil unit, a current to be applied to the second coil unit, and apply the determined current to the second coil unit in a direction that partially cancels an attraction force and/or a repulsive force generated between the first coil unit and the second coil unit.

2. The camera module of claim 1, further comprising:

a first elastic unit comprising an elastically deformable material disposed between the housing and the first lens barrel; and a second elastic unit comprising an elastically deformable material disposed between the housing and the second lens barrel.

3. The camera module of claim 1, further comprising:

a second magnet disposed between the housing and a first face of the first lens barrel and configured to perform an optical image stabilization operation on the first lens barrel;

a third coil unit comprising a third coil disposed adjacent to the second magnet;

a third magnet disposed between the housing and a second face of the first lens barrel; and a fourth coil unit comprising a fourth coil disposed adjacent to the third magnet.

4. The camera module of claim 1, wherein the at least one first lens includes a telephoto lens or a wide-angle lens.

5. The camera module of claim 1, wherein the at least one image sensor includes a first image sensor and a second image sensor, the first portion corresponds to the first image sensor, and the second portion corresponds to the second image sensor.

6. The camera module of claim 1, wherein the lens barrel and an upper face of the first portion face the first direction and are configured to receive light from the first direction, and the second lens barrel and an upper face of the second portion face the second direction and are configured to receive light from the second direction, the second direction being different from the first direction.

7. The camera module of claim 1, wherein the first lens and/or the second lens is configured to include one of: a solid-state lens and a liquid-state lens, wherein the solid-state lens is configured to move along an optical axis to focus on a subject, and the liquid-state lens is configured to adjust a thickness thereof to focus on a subject.

8. A dual camera module comprising:

a housing;

first and second lens barrels disposed in the housing and configured to move along first and second optical axes, respectively; and first and second driving units mounted on the housing, and configured to provide forces for moving the first and second lens barrels along the first and second optical axes, respectively, wherein the first and second driving units share a single magnet, a first coil unit comprising a first coil is disposed to face one face of the single magnet such that the first driving unit includes the single magnet and the first coil unit, and a second coil unit is disposed to face another face of the single magnet such that a second driving unit includes the single magnet and a second coil unit; and a control unit comprising processing circuitry configured to control application of current to the first coil unit and/or the second coil unit, the control unit comprising processing circuitry configured to determine, based on current applied to the first coil unit, a current to be applied to the second coil unit, and apply the determined current to the second coil unit in a direction that partially cancels an attraction force and/or a repulsive force generated between the first coil unit and the second coil unit.

9. The dual camera module of claim 8, wherein the single magnet is mounted to be upright between the first and second optical axes in a direction parallel to directions of each of first and second optical axes.

10. The dual camera module of claim 9, wherein the first coil unit and the first lens barrel and the second coil unit and the second lens barrel are disposed symmetrically with respect to the single magnet.

11. The dual camera module of claim 8, wherein the housing includes:

a base;

a cover, which is at least partially opened and configured to be assembled with the base in an optical axis direction; and a support coupled between the base and the cover and configured to support the first and second lens barrels.

12. The dual camera module of claim 11, wherein the single magnet is fixed to the base.

13. The dual camera module of claim 8, wherein first and second driving units are disposed to face each other between the first and second lens barrels, and a single magnet is shared by the first and second driving units.

14. The dual camera module of claim 13, further comprising:

a first upper spring disposed between the cover and an upper end of a support configured to support the first lens barrel;

a first lower spring disposed between the base and a lower end of the support configured to support the first lens barrel;

a second upper spring disposed between the cover and the upper end of the support configured to support the second lens barrel; and a second lower spring disposed between the base and the lower end of the support configured to support the second lens barrel.

15. The dual camera module of claim 8, further comprising:

a first carrier coupled with the first lens barrel and a second carrier coupled with the second lens barrel, wherein the first lens barrel is configured to move along a first optical axis by a first driving force provided by the first driving unit in the housing, and the second lens barrel is configured to move along a second optical axis by a second driving force provided by the second driving unit in the housing.

16. The dual camera module of claim 8, wherein the first and second lens barrels are arranged to face a same direction or to face opposite directions.

17. The dual camera module of claim 8, wherein the first and second lens barrels are configured to have a same size and to be arranged symmetrically, or configured to have different sizes and to be arranged asymmetrically.

18. The dual camera module of claim 8, further comprising:

a third driving unit comprising a second magnet and a third coil disposed on a first side of the lens barrel, which is parallel to the first driving unit, and configured to perform X-axis optical image stabilization; and a fourth driving unit comprising a third magnet and a fourth coil disposed on a second side of the lens barrel perpendicular to the first driving unit, and configured to perform Y-axis optical image stabilization.

* * * * *